US008241686B2

(12) United States Patent
Powers et al.

(10) Patent No.: US 8,241,686 B2
(45) Date of Patent: *Aug. 14, 2012

(54) METHOD AND APPARATUS FOR PRODUCTION OF ELONGATED MEAT PRODUCTS WITHOUT CASINGS

(75) Inventors: Richard Powers, Overland Park, KS (US); Adam E. Anderson, Leawood, KS (US); Paul Hardenburger, Hutchinson, KS (US)

(73) Assignee: Marlen International, Inc., Overland Park, KS (US)

( * ) Notice: Subject to any disclaimer, the term of this patent is extended or adjusted under 35 U.S.C. 154(b) by 77 days.

This patent is subject to a terminal disclaimer.

(21) Appl. No.: 12/703,396

(22) Filed: Feb. 10, 2010

(65) Prior Publication Data

US 2010/0209570 A1 Aug. 19, 2010

Related U.S. Application Data

(60) Provisional application No. 61/152,576, filed on Feb. 13, 2009, provisional application No. 61/222,765, filed on Jul. 2, 2009.

(51) Int. Cl.

| | |
|---|---|
| ***A23L 1/31*** | (2006.01) |
| ***A23L 1/00*** | (2006.01) |
| ***A23G 3/02*** | (2006.01) |
| ***A22C 7/00*** | (2006.01) |
| *A23B 4/052* | (2006.01) |

(52) U.S. Cl. ........ 426/278; 426/517; 426/516; 426/513; 99/352

(58) Field of Classification Search .................. 426/278, 426/517, 516, 557, 510, 512, 556, 513; 99/352, 99/409, 427
See application file for complete search history.

(56) References Cited

U.S. PATENT DOCUMENTS

| | | | |
|---|---|---|---|
| 1,942,582 | A | 1/1934 | Vogt |
| 1,964,009 | A | 6/1934 | Vogt |
| 1,964,011 | A | 6/1934 | Vogt |

(Continued)

FOREIGN PATENT DOCUMENTS

| | | |
|---|---|---|
| GB | 0855108 | 11/1960 |

(Continued)

OTHER PUBLICATIONS

International Search Report and Written Opinion; Dated Nov. 19, 2010; S/N PCT/US2010/023817; Filed Feb. 11, 2010.

*Primary Examiner* — D. Lawrence Tarazano
*Assistant Examiner* — Jerry W Anderson
(74) *Attorney, Agent, or Firm* — Hovey Williams LLP

(57) ABSTRACT

A system (50) is provided for the production of elongated comestible products such as hot dogs, without the use of traditional casings. The system (50) includes a circular pattern of arrays (92) of elongated, open-ended, extruded synthetic resin cooking tubes (94, 96) within a rotatable cylindrical heating drum or housing (70). The tube housing (70) and arrays (92) are incrementally rotated and at each stop position certain of the tubes (94, 96) are filled with portions of meat emulsion (590) and alternating plugs (208), while previously filled tubes (94, 96) containing cooked product are unloaded, and other unfilled tubes are internally coated with a lubricant (e.g., a mixture of lecithin and vegetable oil). Energy exchange media such as hot water and/ or steam are used within the housing to continuously cook the emulsion portions within the tubes (94, 96) to the desired extent.

48 Claims, 29 Drawing Sheets

U.S. PATENT DOCUMENTS

| | | | | |
|---|---|---|---|---|
| 2,043,132 | A | | 6/1936 | Vogt |
| 2,182,211 | A | | 12/1939 | Paddock |
| 2,897,745 | A | | 8/1959 | Nichols et al. |
| 2,995,449 | A | | 8/1961 | Allen et al. |
| 3,005,716 | A | | 10/1961 | Moreland |
| 3,068,104 | A | | 12/1962 | Gretler et al. |
| 3,081,173 | A | | 3/1963 | Gretler et al. |
| 3,132,950 | A | | 5/1964 | Macy et al. |
| 3,149,980 | A | | 9/1964 | Gretler et al. |
| 3,223,530 | A | | 12/1965 | Weprin |
| 3,421,434 | A | | 1/1969 | Krachmer |
| 3,502,018 | A | | 3/1970 | Keszler |
| 3,700,847 | A | | 10/1972 | Rendek et al. |
| 3,889,013 | A | | 6/1975 | Moule |
| 3,916,483 | A | | 11/1975 | Vinokur |
| 4,113,890 | A | * | 9/1978 | Long ............................ 426/512 |
| 4,280,803 | A | * | 7/1981 | Treharne ......................... 425/99 |
| 4,294,858 | A | | 10/1981 | Moule |
| 4,348,572 | A | | 9/1982 | Moule |
| 4,379,356 | A | | 4/1983 | Geissbuhler |
| 4,404,229 | A | | 9/1983 | Treharne |
| 4,448,793 | A | | 5/1984 | Akesson |
| 4,476,609 | A | | 10/1984 | Loudin |
| 4,549,476 | A | | 10/1985 | Langen |
| 4,726,093 | A | | 2/1988 | Rogers |
| 4,989,505 | A | | 2/1991 | Mally |
| 4,997,663 | A | | 3/1991 | Potthast |
| 5,056,425 | A | | 10/1991 | Mally |
| 5,098,332 | A | | 3/1992 | Handel |
| 5,118,519 | A | | 6/1992 | Mally et al. |
| 5,141,762 | A | | 8/1992 | Mally |
| 5,211,106 | A | | 5/1993 | Lucke |
| RE35,426 | E | | 1/1997 | Mally |
| 6,203,832 | B1 | | 3/2001 | Kramer |
| 6,287,187 | B1 | | 9/2001 | Deckert |
| 6,322,832 | B1 | | 11/2001 | Schiffmann |
| 6,326,039 | B1 | | 12/2001 | Schiffmann et al. |
| 6,632,463 | B1 | | 10/2003 | Townsend |
| 6,764,705 | B2 | | 7/2004 | Shefet |
| 6,989,170 | B2 | | 1/2006 | Konanayakam et al. |
| 7,182,683 | B2 | | 2/2007 | Shefet |
| 7,195,551 | B2 | | 3/2007 | Shefet |
| 7,284,477 | B2 | | 10/2007 | Hansen et al. |
| 7,931,929 | B2 | * | 4/2011 | Powers et al. ................. 426/513 |

FOREIGN PATENT DOCUMENTS

| | | |
|---|---|---|
| GB | 895101 | 5/1962 |
| GB | 1145515 | 3/1969 |
| GB | 2156727 | 10/1985 |
| WO | WO 00 76330 | 12/2001 |

* cited by examiner

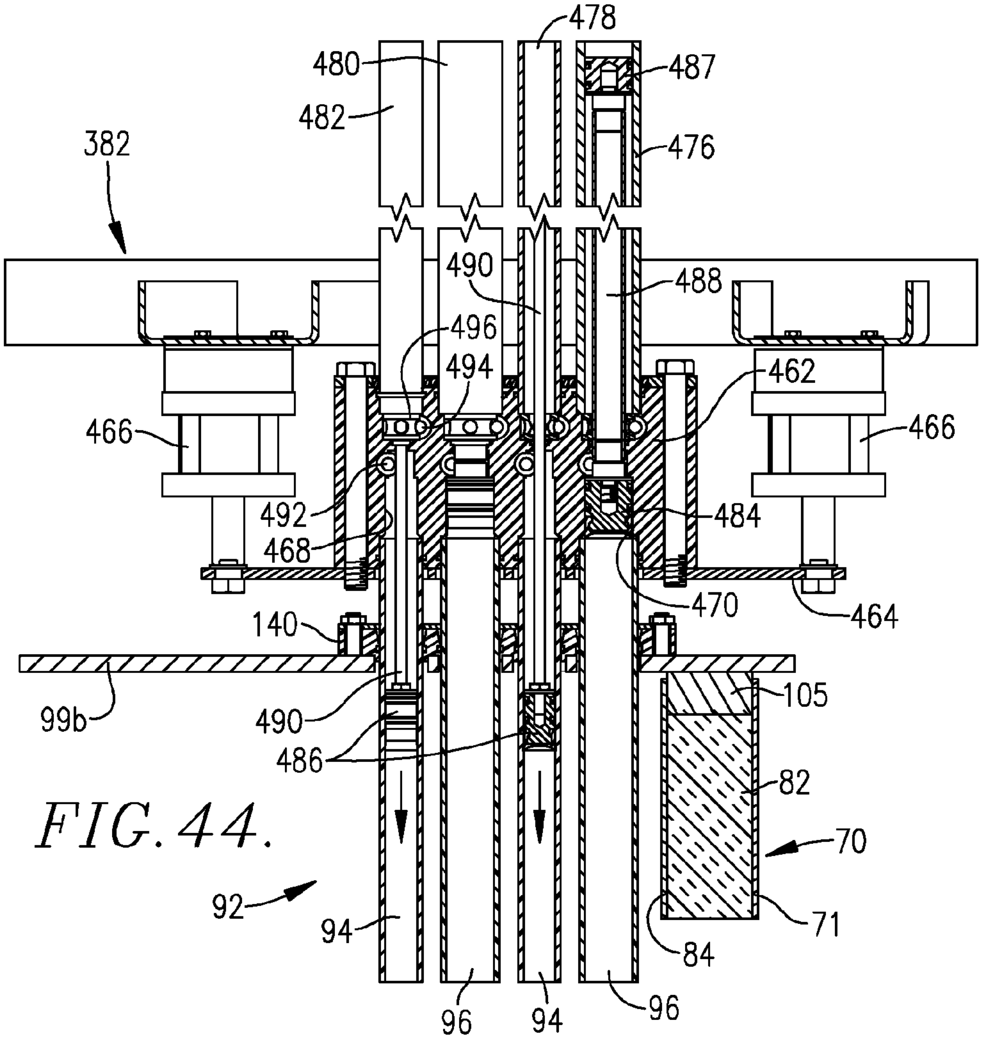
FIG. 44.
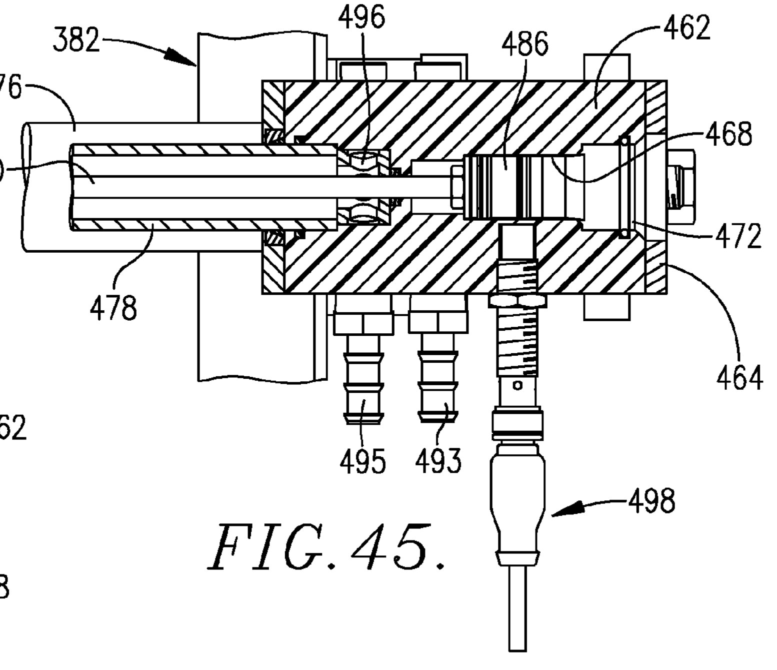
FIG. 45.
FIG. 46.
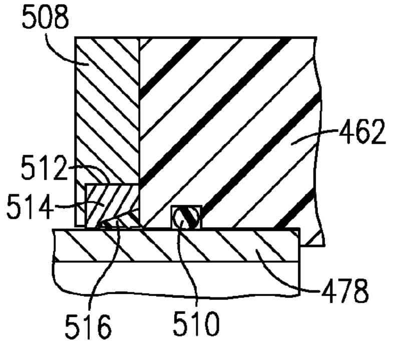

METHOD AND APPARATUS FOR PRODUCTION OF ELONGATED MEAT PRODUCTS WITHOUT CASINGS

CROSS-REFERENCE TO RELATED APPLICATION

This application claims the benefit of Provisional Application Ser. No. 61/152,576, filed Feb. 13, 2009, and to Provisional Application Ser. No. 61/222,765, filed Jul. 2, 2009. Such Provisional Applications are incorporated by reference herein in their entirety.

BACKGROUND OF THE INVENTION

1. Field of the Invention

The present invention is concerned with improved apparatus and methods for the commercial-scale production of elongated cooked food items such as hot dogs, corn dogs and sausages, e.g., Vienna sausages, without the use of casings. More particularly, the invention is directed to such devices and methods wherein automated injector heads coupled with a supply of meat emulsion create successive, predetermined weight portions or charges of emulsion which are then partially or completely cooked in elongated heat exchange cooking tubes. The equipment is preferably designed so that the products are statically heated using a plurality of tubes so as to achieve a batch-continuous operation. Advantageously, the equipment provides a plurality of cooking tube arrays, and delivers meat emulsion to at least one tube array while also removing cooked product from a second array and applying oil to a third array.

2. Description of the Prior Art

Presently, elongated cooked meat products such as hotdogs, the inner meat portions of corn dogs, and Vienna sausages are produced using casings. Generally speaking, a starting meat emulsion is pumped into a casing, and the casing is twisted in order to initially form the product, followed by cooking and/or smoking to fully cook and gelatinize the protein in the emulsion. The product is chilled and the casing is stripped from the cooked product and is discarded. Such use of casing represents a very significant cost to the food processors. Indeed, many large scale plants purchase several million dollars worth of casings per year.

Attempts have been made in the past to process these meat products without the use of casings. However, these efforts have not met with any significant commercial acceptance. The principal difficulty with these prior devices has been that the products are not equivalent to the typical products made with casings. For example, the products may not have the same shape, color, or texture as the conventional counterparts, and are thus unacceptable to consumers.

U.S. Pat. No. 4,113,890 to Long describes a continuous stuffing machine 30 that feeds a tube 32 which injects emulsion into a coil 10 that is covered by a jacket 12. A heat transfer medium, such as steam or hot water, flows through the jacket in a direction opposite to the flow of the emulsion through the coil 10. Metal-core plugs 36 are also inserted into the coil 10 automatically by a loader 62. The loader 62 has two similar chambers 72, 74 that rotate about a central axis 70 that is connected to a gear 64, which may be driven by an external motor. One chamber 74 accepts (by the use of a hydraulic ram 78) a plug 36 from a supply line 60, while at nearly the same time, the other chamber 72 injects (by the use of a hydraulic ram 76) a plug 36 into a feed line 10*c*. The chambers 72, 74 rotate and perform reciprocal tasks in repeated fashion. The plugs 36 and the partially-cooked hot dogs exit the coil 10 onto conveyor 52, where the plugs 36 are separated by a magnetic roller 54 from the hot dogs which continue on conveyor 56. The plugs 36 are dropped into a receptacle 58.

U.S. Pat. No. 3,502,018 discloses a system for fully cooking sausages without casings. The system includes a staffer 14 that forces meat emulsion into a tube which extends through multiple stages 10, 11, 12 of heating. Cooked sausage exits the tube 16 and is carried on a belt 26 through a cooling chamber 13. Cooled sausage exits the cooling chamber 13 and may be cut by blade 32 before being transported by conveyor 36.

U.S. Pat. No. 3,889,013 discloses a system for preparing frankfurters or sausages by creating a casing from the meat product itself. The system includes a supply tank 2 that supplies the meat product to a metering pump 6 which delivers pressurized meat product to a heating unit 8. The meat product is heated in a cylindrical mold 20 to cook the outer surface of the meat product so that it forms a casing. The meat product is then cooled by the cooling unit 10.

See also U.S. Pat. Nos. 2,182,211, 3,421,434, 4,726,093, 4,989,505, 5,056,425, 5,118,519, 6,203,832, 6,322,832, and 6,326, 039.

Notwithstanding these efforts, no commercially successful has heretofore been devised which is capable of properly cooking sausage-type products without casings and while retaining the appearance, taste, and mouth feel of traditional products.

There is accordingly a real and unsatisfied need in the art for improved methods and apparatus capable of producing elongated, partially or fully cooked meat products such as hotdogs or sausages without the use of casings, while still providing finished products equivalent in all respects to conventional products of these types made using casings.

SUMMARY OF THE INVENTION

The present invention overcomes the problems outlined above and provides greatly improved methods and apparatus for the production of elongated comestible products, and especially sausage-type products such as hot dogs, without the need for disposable casings. Thus, the invention entirely eliminates the costly expedient of using disposable casings, which greatly minimizes production costs. Moreover, the invention is characterized by reduced energy consumption owing to the use of conduction cooking, reduced labor costs, and improved food safety. The system of the invention also discharges product in an organized fashion wherein the products are oriented end-to-end in straight lines, which facilitates downstream product management.

Generally speaking, the apparatus of the invention includes a plurality of elongated, separate, individual cooking tubes, each presenting a longitudinal axis and an inlet end. A loading station is provided which includes structure operable to load comestible material (e.g., meat emulsion) into the inlets of the tubes. Shifting mechanism is also provided which is operable to shift the tubes in a first direction transverse to the longitudinal axes thereof and into the loading station for successive loading. The shifting movement may be of any suitable type, such as circular or reciprocal. The overall apparatus further has a cooking arrangement to at least partially cook the comestible material within the tubes, as well as a discharge station separate from the loading station and including discharge structure for discharge of the at least partially cooked material from the cooking tubes. To this end, the shifting mechanism is also operable to successively shift the tubes containing the at least partially cooked comestible material in a second direction also transverse to the longitudinal axes and into the discharge station.

Preferably, the cooking tubes have open inlet and outlet ends and are arranged in a circular pattern with the tubes substantially parallel with each other and in circumferentially spaced apart relationship. In this embodiment, the tubes are incrementally moved in the same direction (i.e., either clockwise or counterclockwise) into and out of the loading and discharge stations during rotation of the tube pattern. Advantageously, and in order to increase production capacity, an array of radially spaced apart tubes are provided at each circumferentially spaced apart tube position, and the loading and discharge stations are appropriately equipped to simultaneously load and discharge plural tubes. The arrays may have tubes of different diameters, so that differentially sized products may be produced on the same machine. In such an arrangement, the tubes are located within a cylindrical, axially rotatable, water-tight housing, and energy exchange media (e.g., heated water and/or steam) surrounds the tubes for cooking of the comestible material within the tubes during tube rotation.

In order to create properly formed hot dog and related products, the loading station includes structure for successively introducing forming plugs into the tubes between successive portions of the comestible material. Thus, at the loading station, each cooking tube is filled with individual portions of material with a plug on either end of and in engagement with the portion. In such operations, the discharge station is equipped with specialized apparatus for recovery of the plugs as they are discharged, in order to return the plugs to the loading station for reuse. A particularly useful feature is that the plug recovery apparatus maintains the plugs in a substantially parallel alignment with the longitudinal axes of the tubes throughout the recovery sequence. Thus, the tubes are handled in the most efficient manner and without the need for manual manipulation thereof.

The loading station of the system of the invention preferably includes an improved apparatus for loading of the cooking tubes with both portions of comestible material and forming plugs. This apparatus broadly includes a magazine operable to hold a plurality of the elongated plugs and to individually deliver the plugs to a plug delivery location. An elongated, axially shiftable plug seating rod is adjacent the magazine and is oriented to engage and move successive plugs from the plug delivery location. An elongated, axially rotatable plug and meat injection rod is provided, which is spaced from the seating rod and is located proximal to the tube inlet end, with the longitudinal axis of the injection rod being substantially coaxial with the tube longitudinal axis. The apparatus also has a portioning assembly spaced from both of the rods and includes structure for successively forming and delivering individual portions of the comestible material, as well as an input for the comestible material.

A shiftable plate is located between the injection rod and the cooking tube open end and has a plug seating and injection bore, a material conveying bore, and a material delivery bore. Shifting mechanism is coupled with the plate for selective shifting thereof between a first position wherein the seating and injection bore is aligned with the seating rod, and the material delivery bore communicates the portioning assembly with the tube inlet, and a second position wherein the seating and injection bore is aligned with the injection rod and the tube inlet, and the material conveying bore communicates the input and the portioning assembly. An operating mechanism is coupled with the plate shifting mechanism, the seating rod, the injecting rod, and the portioning assembly. This serves to shift the plate to the first position thereof and to cause (a) shifting of the seating rod to shift a plug from the plug delivery location and into the seating and injection bore of the plate, and (b) to operate the portioning assembly in order to deliver a portion of the material to the tube inlet. The operating mechanism also subsequently shifts the plate to the second position thereof and causes (c) shifting of the injection rod to shift the seated plug from the seating and injection bore and into the tube through the tube inlet, and (d) to operate the portioning assembly to create a portion of the material for subsequent delivery to the cooking tube behind the injected plug.

The preferred systems of the invention are provided with an output conveyor for finished product also having a spray assembly for the application of liquids to the cooked products, in order to increase the palatability thereof, and to facilitate downstream additional processing or packaging. A plug recovery assembly is also provided in order to recover plugs from the output conveyor and to direct these plugs for reuse; if desired, the plugs may be washed during recovery thereof.

An additional feature of the invention is the provision of a plug storage assembly, which is an adjunct of the plug recovery assembly. The storage assembly is operable to create accumulated rows of plugs from the discharge station and to successively move such rows onto a receiving rack.

BRIEF DESCRIPTION OF THE DRAWINGS

FIG. 44 is a view similar to that of FIG. 42, but showing the oil application assembly in operation during injection of oil into the cooking tubes;

FIG. 45 is a fragmentary, vertical, sectional view illustrating components of the oil application assembly;

FIG. 46 is a fragmentary sectional view illustrating the end seal arrangement in the oil application assembly;

DETAILED DESCRIPTION OF THE PREFERRED EMBODIMENT

Figure 1:
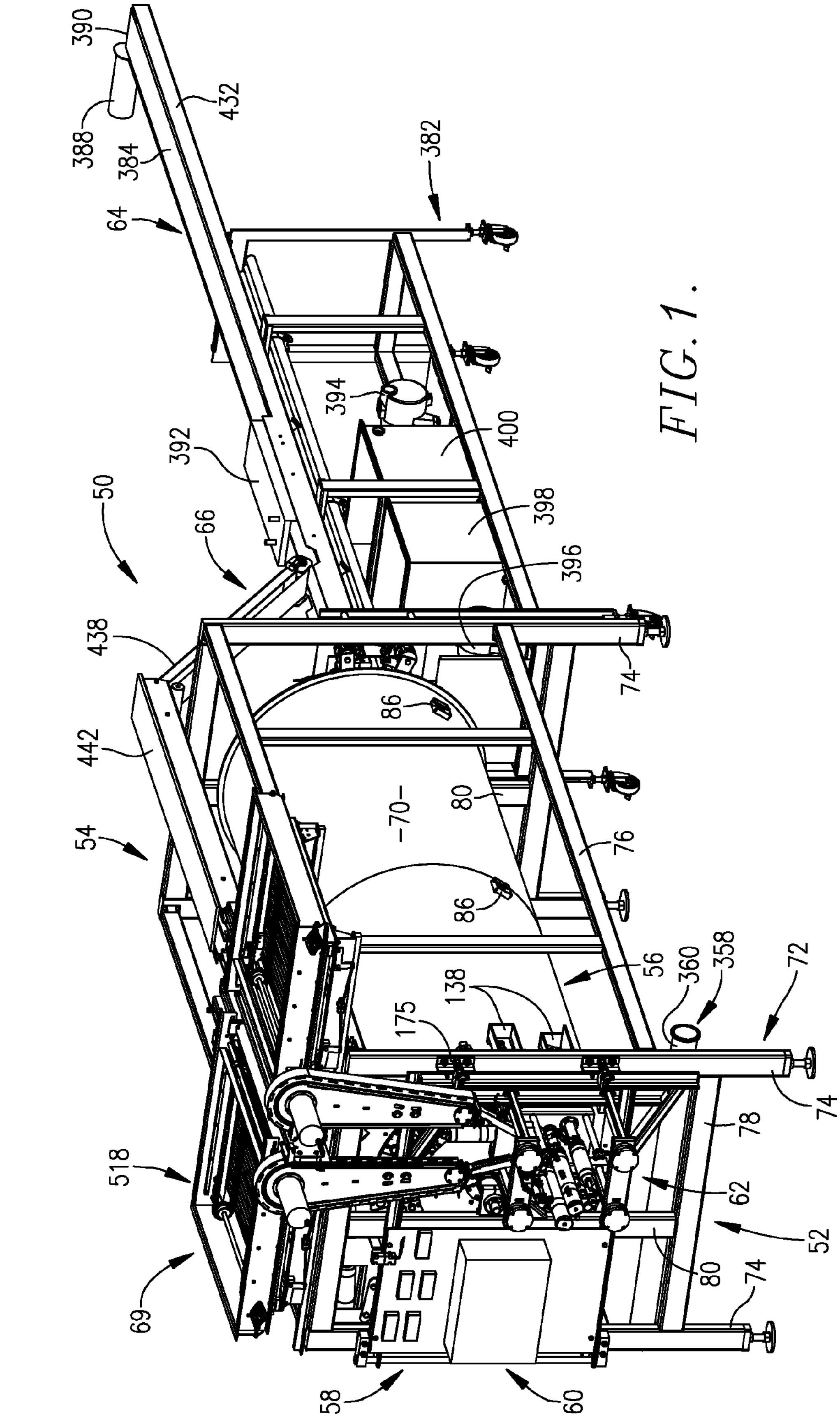
FIG. 1 is a perspective view of a processing system in accordance with the present invention, operable for the batch-continuous production of elongated, sausage-type products, and viewing the input end of the system.
Figure 2:
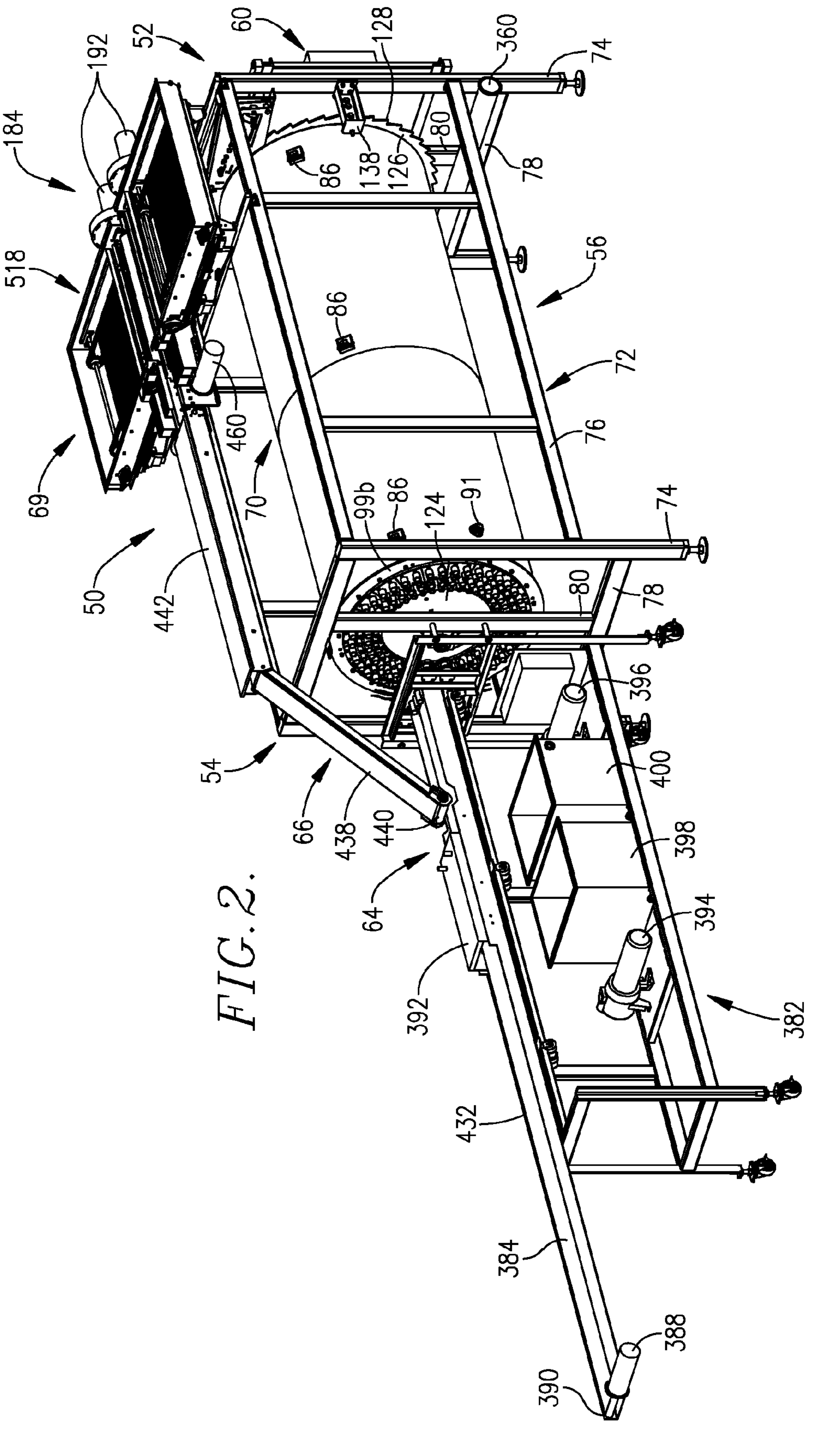
FIG. 2 is another perspective view of the processing system of FIG. 1, but viewing the output end thereof.

Turning now to the drawings, a processing system 50 is illustrated in FIGS. 1 and 2. The system 50 presents an input end 52 and an output end 54, and broadly includes a cooking drum assembly 56, a gate assembly 58 at the input end 52 supporting a control panel 60, a forming plug and meat emulsion injection assembly 62, and a water ejection assembly 63. A cooked product output conveyor 64 is situated adjacent output end 54, along with a finished product and plug delivery assembly 65, a plug recovery assembly 66, and an oil application assembly 68. A plug storage assembly 69 is situated above cooking drum assembly 56, as shown. The system 50 is designed to produce elongated, cooked, commercially acceptable sausage-type products on a continuous basis without the use of casings. In the system 50, the assembly 62 defines a loading station, whereas assemblies 63 and 65 and conveyor 64 cooperatively define a discharge station.

Cooking Drum Assembly 56

In more detail, the cooking drum assembly 56 includes an elongated, axially rotatable, cylindrical housing 70 supported on a frame assembly 72. The latter has upright corner posts 74 with interconnecting lateral frame members 76, 78 and a pair of upright central posts 80 at each end of the frame assembly. The housing 70 comprises an outer wall 71, an inner wall 84, with end spacers 105 (see FIGS. 41-42) and intermediate spacers 85 interconnecting the walls 71, 84. Thermal insulation 82 is situated between the walls 71, 84.(see FIG. 41). A series of temperature probes 86 are mounted on housing 70 and extend into the interior of the housing, along with a steam vent 91. The vent 91 can be opened in order to allow filling of the housing 70 with water.

Figure 40:
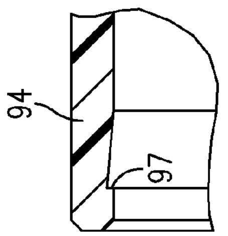
FIG. 40 is a fragmentary, enlarged sectional view illustrating the plug-retaining should of the input end of the cooking tube.
Figure 39:
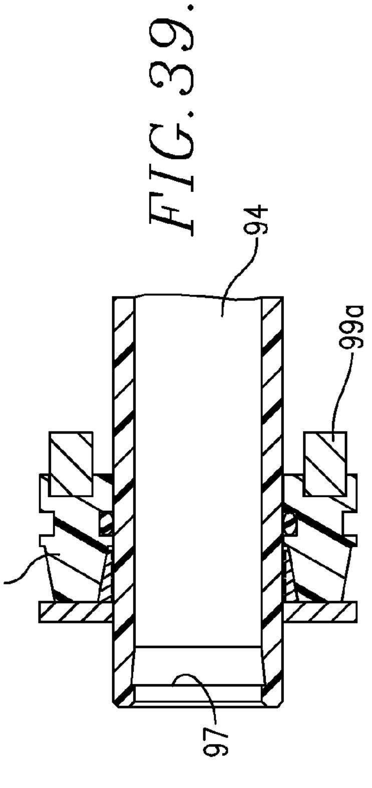
FIG. 39 is an enlarged sectional view of the input end of a cooking tube.

Internally, the assembly 56 has a plurality of radially extending, circumferentially spaced apart tube arrays 92. Each such array is made up of two smaller diameter cooking tubes 94 and two larger diameter cooking tubes 96. Each tube has an inlet end presenting an inwardly extending, plug-retaining shoulder 97 (see FIGS. 39-40). All of the tubes 94, 96 are substantially rectilinear and extend the full length of housing 56, and are supported by fore and aft annular, apertured plates 98, 100. In addition, two intermediate supporting plates (not shown), identical to the plates 98, 100, are located between the latter. The plates 98, 100 and the intermediate plates are in maintained in proper spaced relationship by elongated rigid rods 102. An elongated, tubular, fixed, central mounting member 104 having fore and aft bearing surfaces 106, 108 also extends the full length of the housing 70. The outboard ends of the mounting member 104 are supported by fittings 110 affixed to the central posts 80 (see FIG. 12).

Figure 17:
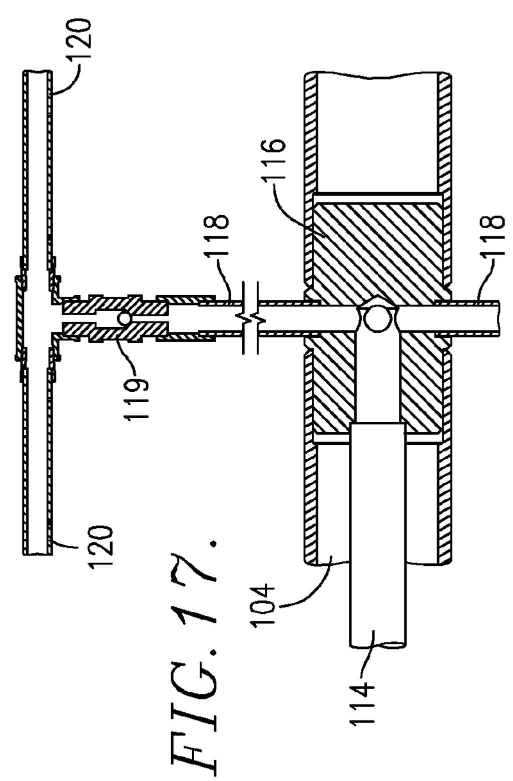
FIG. 17 is an enlarged, fragmentary, sectional view illustrating the steam injection assembly forming a part of the cooking drum.

A stationary steam injection assembly 112 is positioned within housing 70 and includes a steam injection pipe 114 extending through the forward portion of mounting member 104 and terminating in an injection manifold 116 (FIG. 17). The manifold 116 supports a total of four radially extending, circumferentially spaced steam delivery stems 118 in communication with pipe 114; each stem 118 has a check valve 119 therein to prevent backward flow of water into the steam injection assembly 112. The stems 118 are operably coupled with a total of four elongated, axially extending steam tubes 120 within housing 70 and having apertures for delivery of steam throughout the entire lengths thereof. The ends of the tubes 120 are supported on circular mounts 122, which are in turn secured to mounting member 104.

The ends of the housing 70 are defined by solid, apertured fore and aft bulkheads 99*a* and 99*b*, which have the identical pattern of apertures of the corresponding plates 98, 100 (see FIGS. 2 and 12-14). The bulkheads also have a solid section 124 inboard of the arrays 92, equipped with central nylon bearings engaging the bearing surfaces 106, 108. The bulkheads 99*a*, 99*b* are secured to housing 70 by means of threaded fasteners extending through the bulkhead margins and coupled with internal spacer rings 105.

Figures 9, 10, 11, 12:
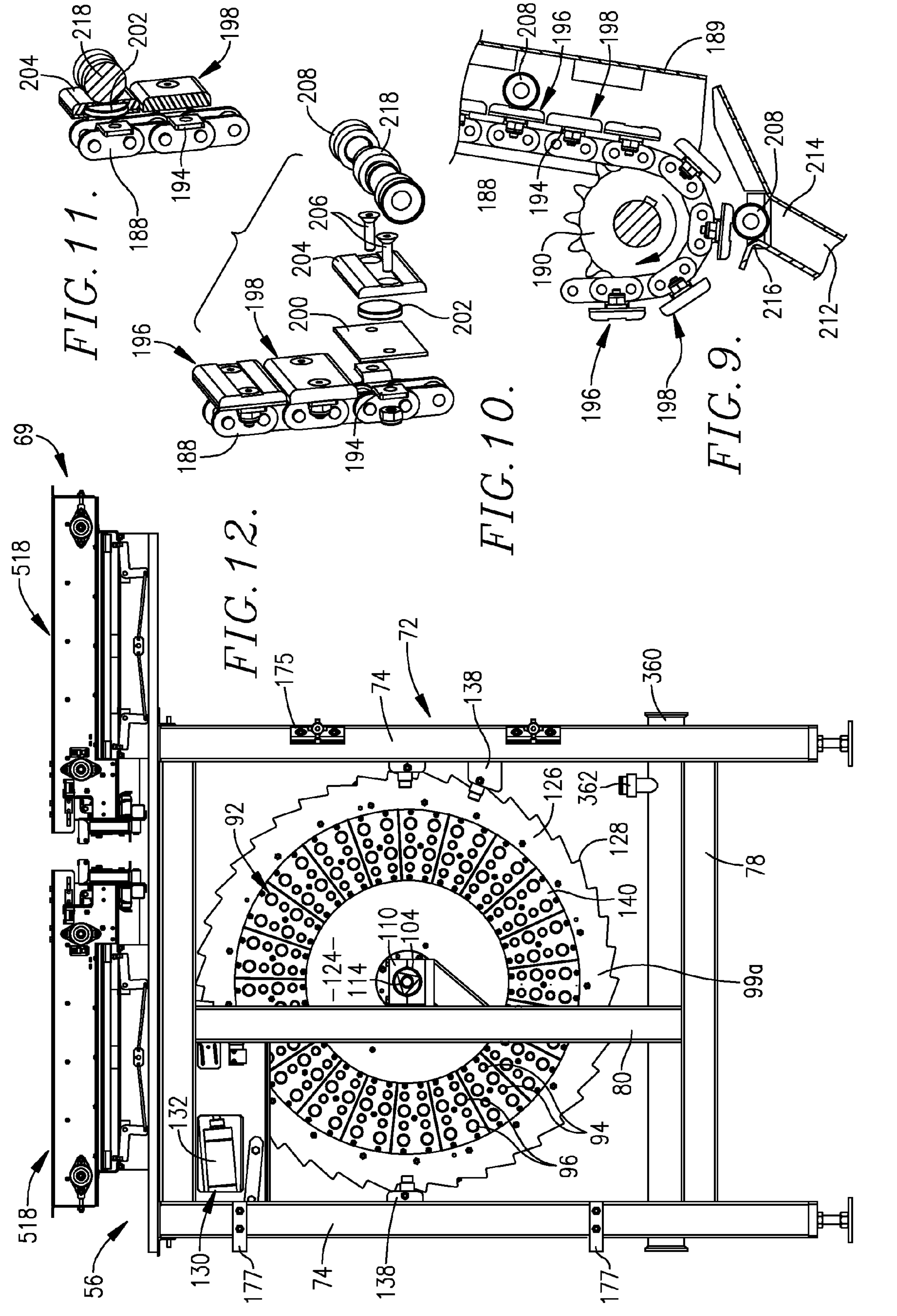
FIG. 9 is a fragmentary, vertical sectional view of a portion of the plug and meat emulsion injection assembly, and illustrating delivery of plugs to a plug magazine.
FIG. 10 is a fragmentary, exploded, perspective view depicting one of the magnetic plug pickups forming a part of the plug and meat emulsion injection assembly.
FIG. 11 is a perspective sectional view of one of the magnetic pickups.
FIG. 12 is an end elevational view of the input end of the processing system, with the gate assembly removed and illustrating the input end of the cooking drum.
Figure 13:
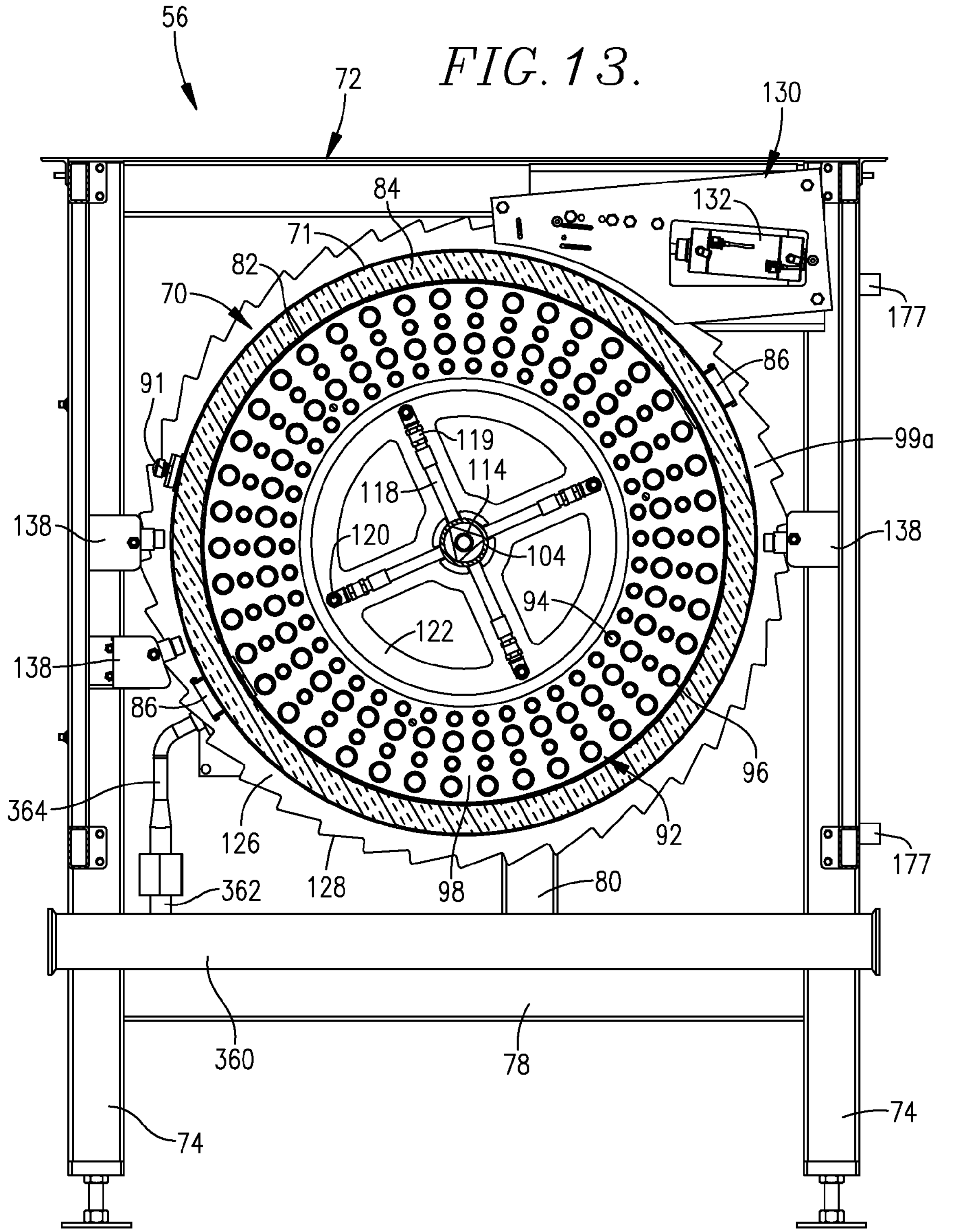
FIG. 13 is a vertical sectional view of the cooking drum of the system, taken at a central location.
Figure 15:
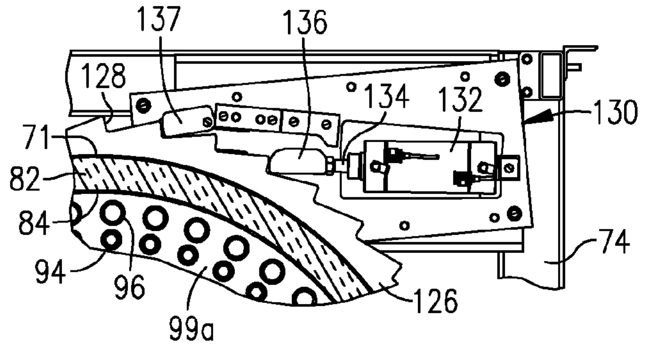
FIG. 15 is an fragmentary, sectional view illustrating the operation of the cooking drum indexing device operable to incrementally rotate the drum during operation of the processing system.
Figure 14:
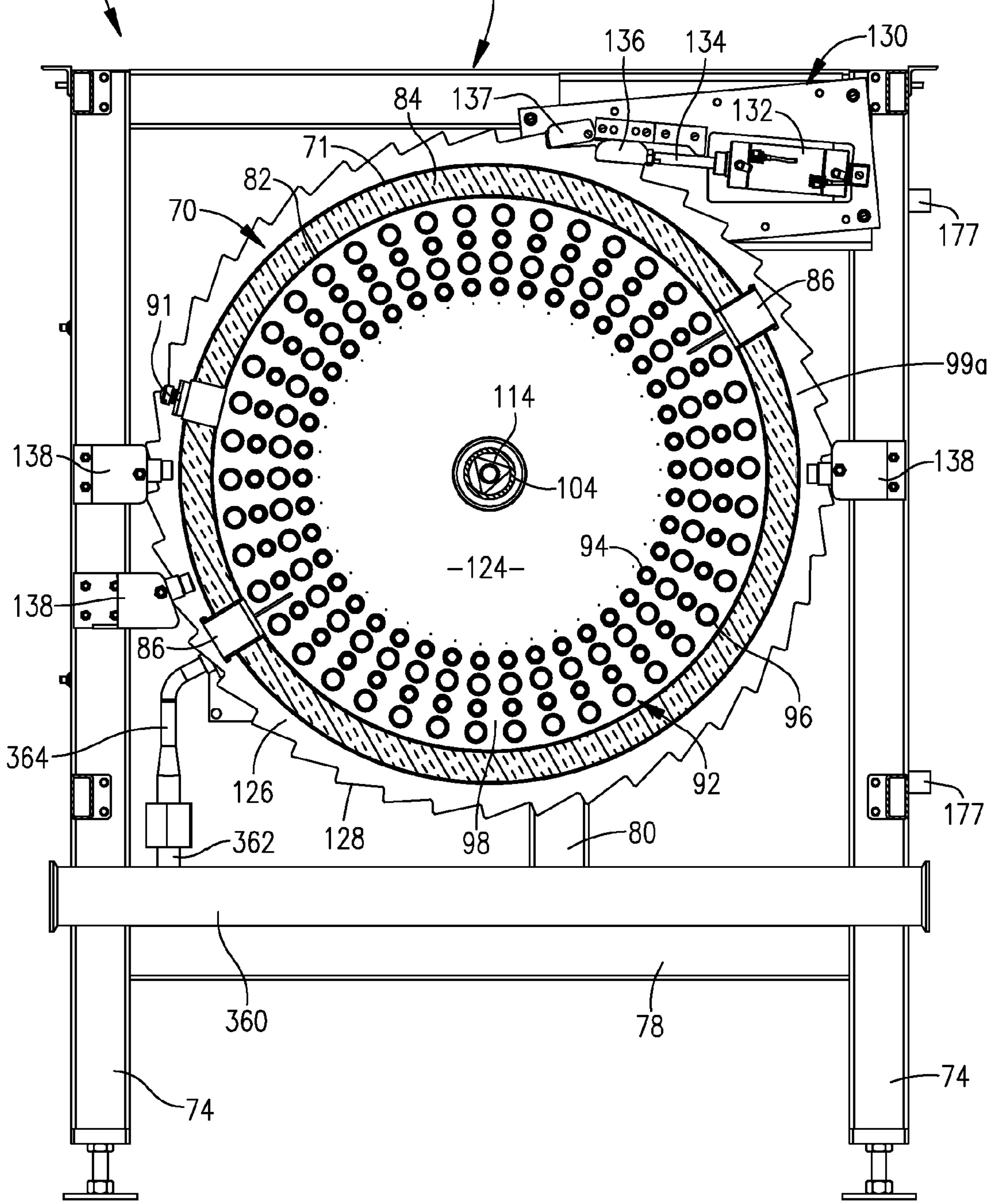
FIG. 14 is another vertical sectional view of the cooking drum, at a location closer to the inlet end of the drum, as compared with FIG. 13.
Figure 16:
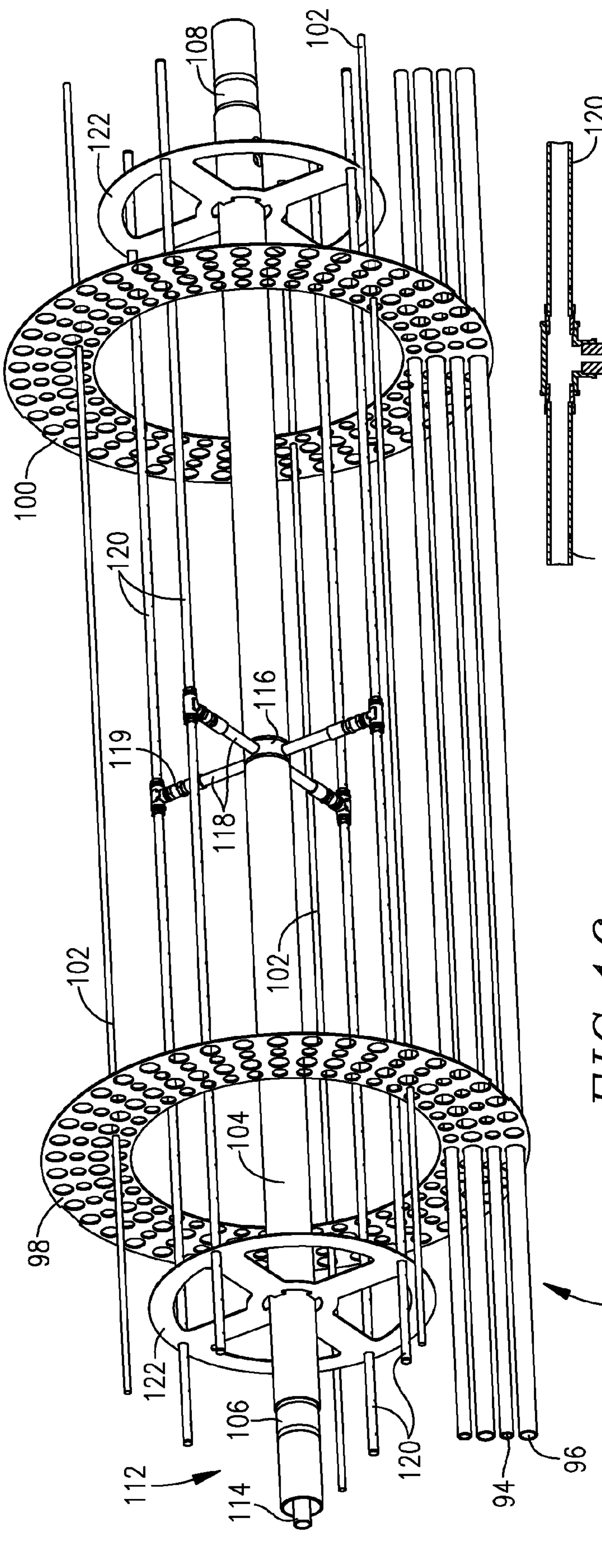
FIG. 16 is a perspective view of internal components of the cooking drum.

Referring to FIGS. 12-14, the input bulkhead 99*a* is provided with an integral, annular indexing ring section 126 having a series of outermost teeth 128. An indexing drive 130 is mounted to the forward portion of frame assembly 72, and has a pivotally mounted pneumatic actuating cylinder 132 with an extendable rod 134 terminating in a fixture 136 complemental with teeth 128 (FIGS. 14-15). A pivotal locking element 137 serves to hold the housing 70 in place between indexing movements thereof. A total of three dual roller guides 138 are secured to the forward corner posts 74 and engage indexing ring section 126 in order to assure smooth rotation of the cooking drum. It will be appreciated that the ring 126 and drive 130 provide a mechanism for incremental shifting of the housing 70 and thus tubes 94, 96.

Figures 34, 35, 36, 37, 38:
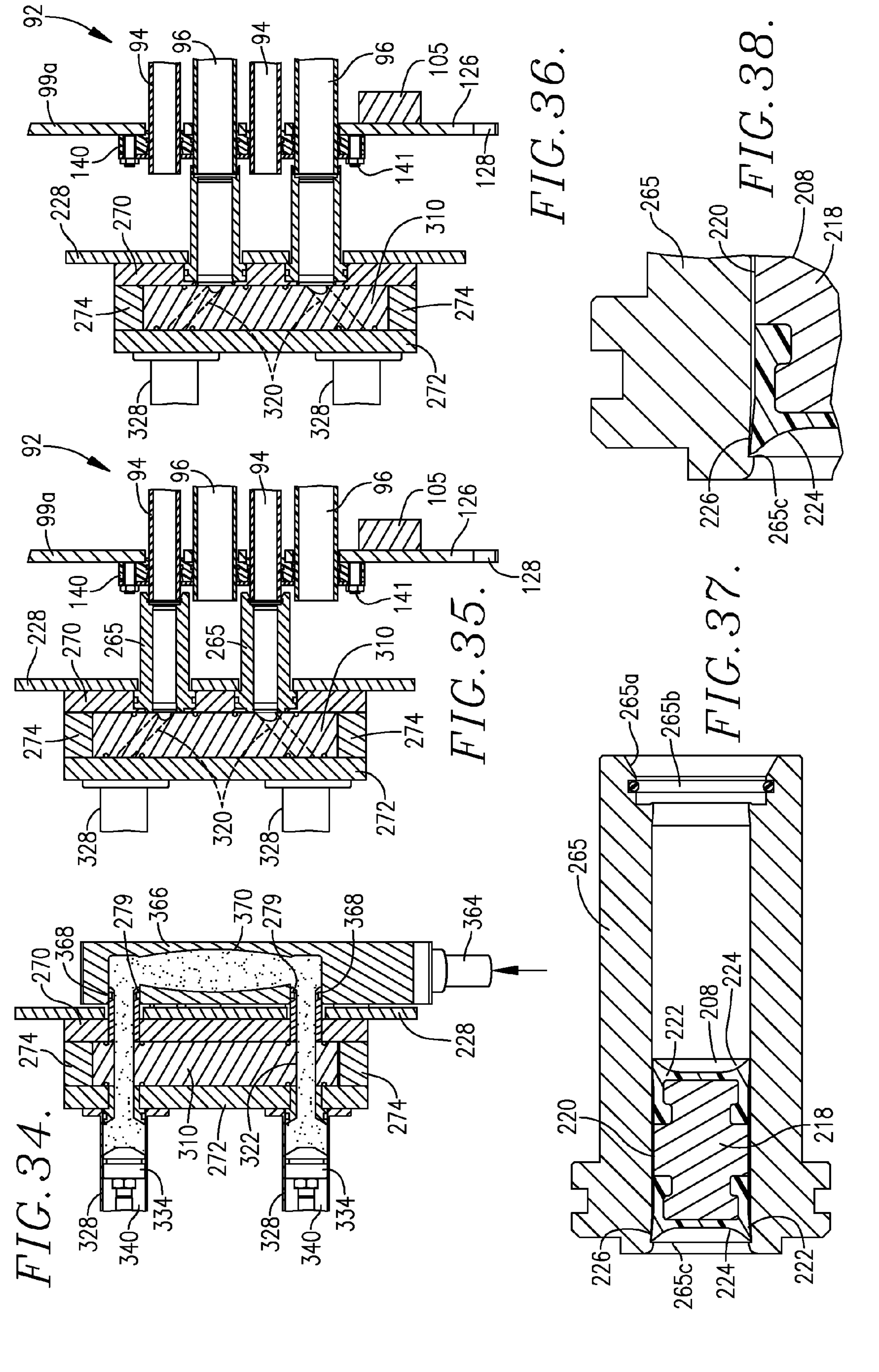
FIG. 34 is a sectional view of the meat emulsion delivery block and illustrating the connection thereof to a pair of emulsion cylinders forming a part of the plug and meat emulsion injection assembly.
FIG. 35 is a fragmentary sectional view illustrating a pair of delivery tubes forming a part of the plug and meat emulsion injection assembly, with the delivery tubes mated with corresponding cooking tubes of the cooking drum.
FIG. 36 is a view similar to that of FIG. 35, but illustrating the alternate use of larger diameter cooking tubes for the production of differently sized end products, as compared with FIG. 35.
FIG. 37 is an enlarged, vertical sectional view illustrating a plug injected into one of the delivery tubes.
FIG. 38 is a greatly enlarged, fragmentary sectional view depicting the plug-retaining shoulder of the delivery tube.

Referring now to exemplary cooking FIG. 35, an array 92 of cooking tubes 94, 96 is illustrated, along with the associated sealing structure. Specifically, at the forward end of the array 92, an apertured sealing block 140 is provided secured by fasteners 141 to bulkhead 99*a*. The sealing block 140 is equipped with sealing rings to provide a watertight seal. The aft end of the tube array 92 is likewise provided with an identical sealing block 140 (see FIG. 41) in order to provide the same type of seal. In practice, each of the sealing blocks 140 is used to seal a pair of adjacent tube arrays 92.

Figure 49:
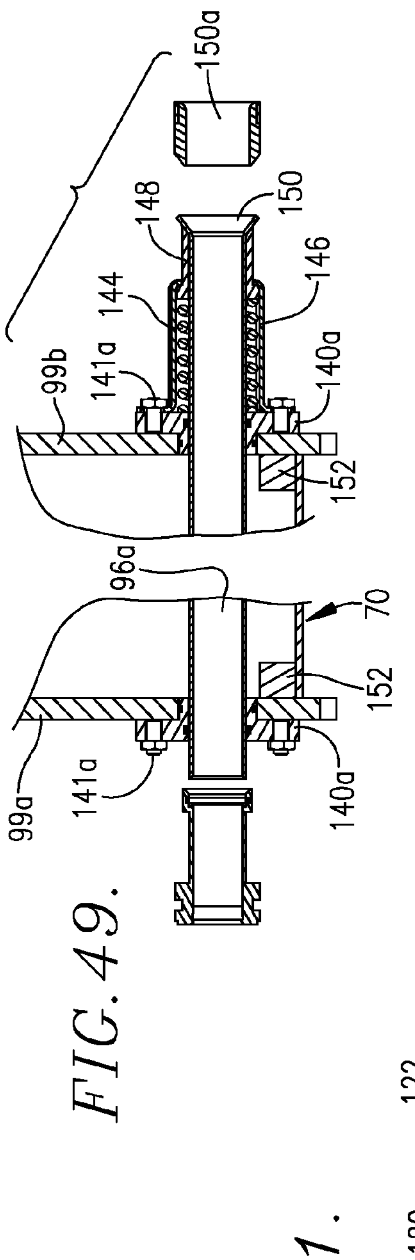
FIG. 49 is a fragmentary, sectional view illustrating an alternate, spring-biased cooking tube embodiment.

Referring to FIG. 49, an alternate embodiment is illustrated. In this case, the cooking tubes, such as exemplary cooking tube 96*a*, are shiftable during operation of the processing system. Accordingly, the cooking tubes are sealed by means of a sealing block 140*a* secured to bulkhead 99*b* by fasteners 141*a*. In addition, it will be observed that a biasing spring 144 is positioned about the aft end of tube 96*a* and abuts the rear sealing block 140*a*, which biases the outer ends of the tube away from bulkhead 99*a*. The spring 144 is within a housing 146, which is secured between a connecting ring 148 and the fasteners 141. The rearmost end of tube 140 has a bevel 150, as shown. A tubular, beveled actuator 150*a* is designed to mate with bevel 150 during operation of the alternate embodiment, as will be described. As also depicted in FIG. 49, the bulkheads 99*a*, 99*b* are secured to housing 70 by means of annular endmost connector rings 152 secured to the inner surface of the housing and which receive threaded fasteners (not shown).

Gate Assembly 58

Figures 3, 4:
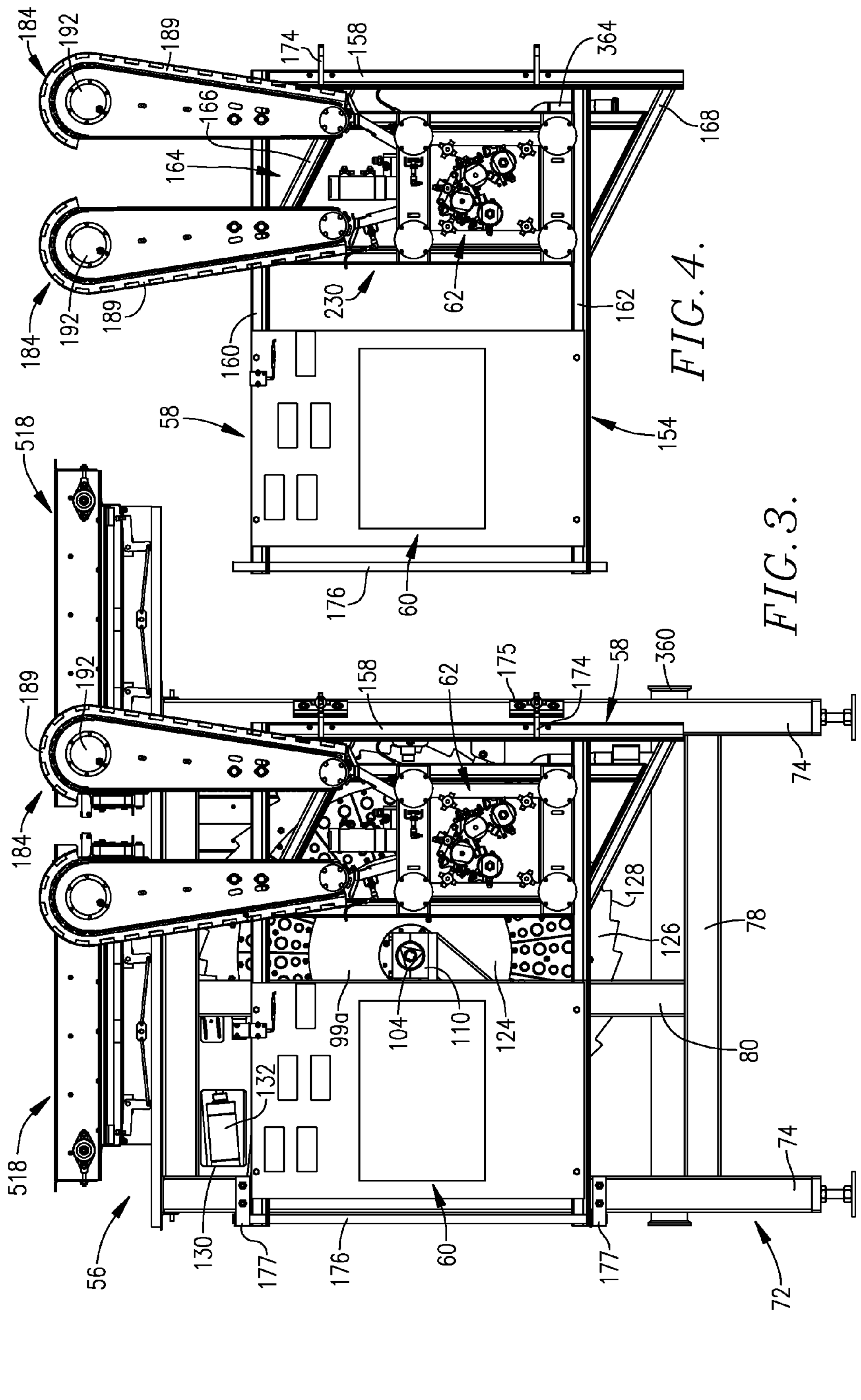
FIG. 3 is an end elevational view of the processing system, viewing the input end thereof.
FIG. 4 is an end elevational view of the front face of a gate assembly forming a part of the input end of the processing system, and supporting the plug and meat emulsion injection assembly.
Figure 5:
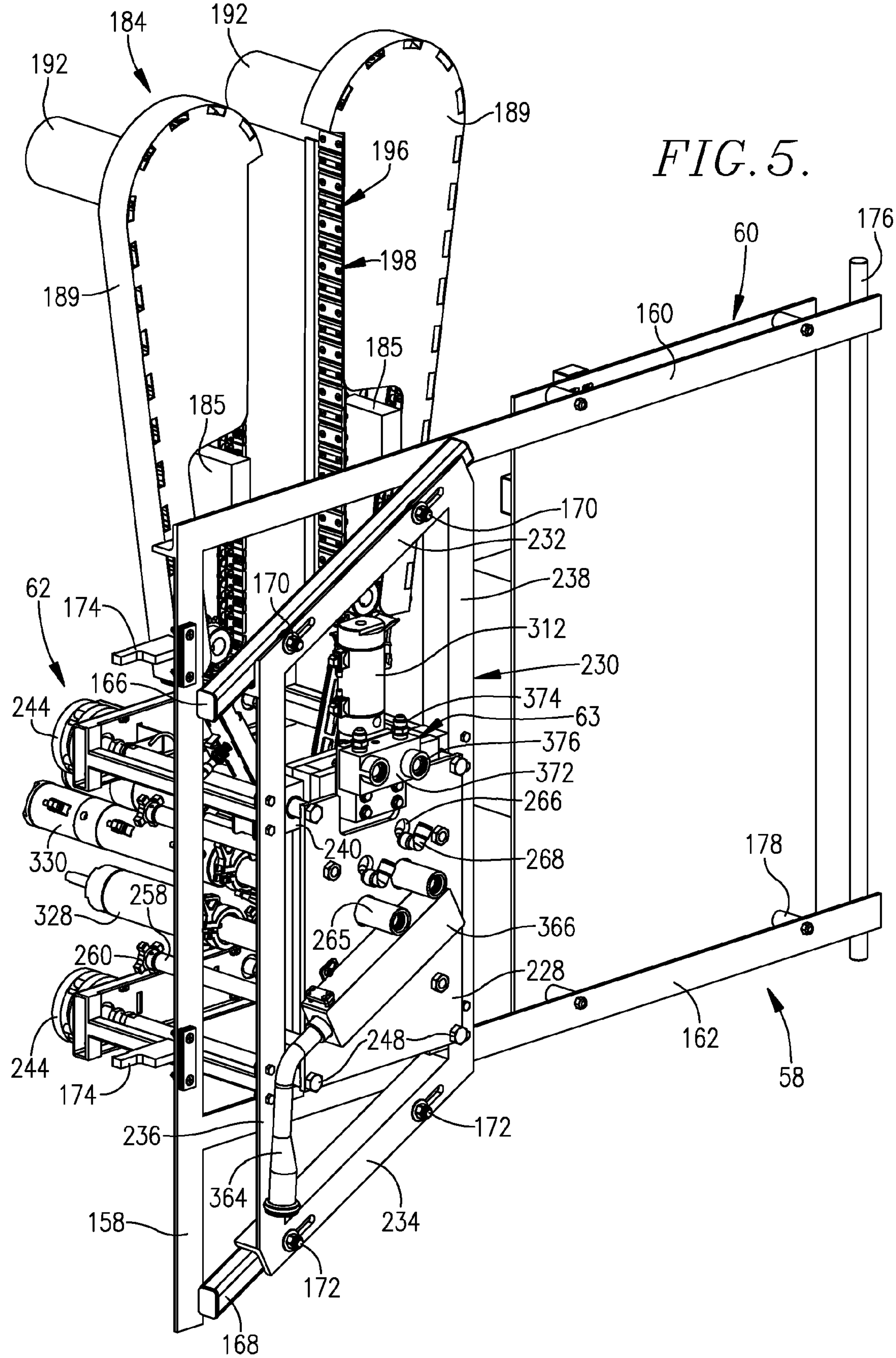
FIG. 5 is a perspective view of the plug and meat emulsion injection assembly of FIG. 4, viewing the rear face thereof.
Figure 6:
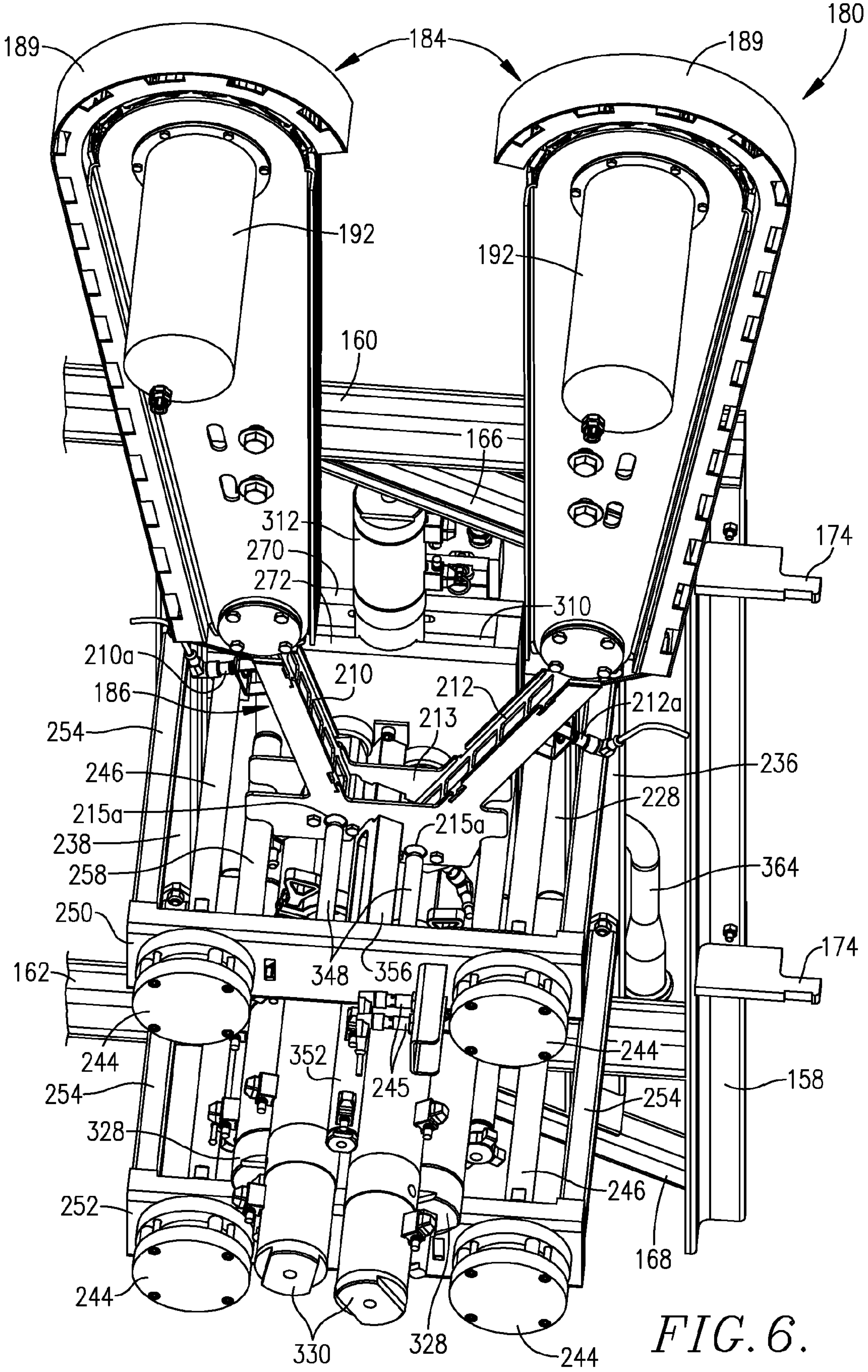
FIG. 6 is a fragmentary, perspective view of the plug and meat emulsion injection assembly of FIGS. 4 and 5, viewing downwardly from the top thereof.
Figure 7:
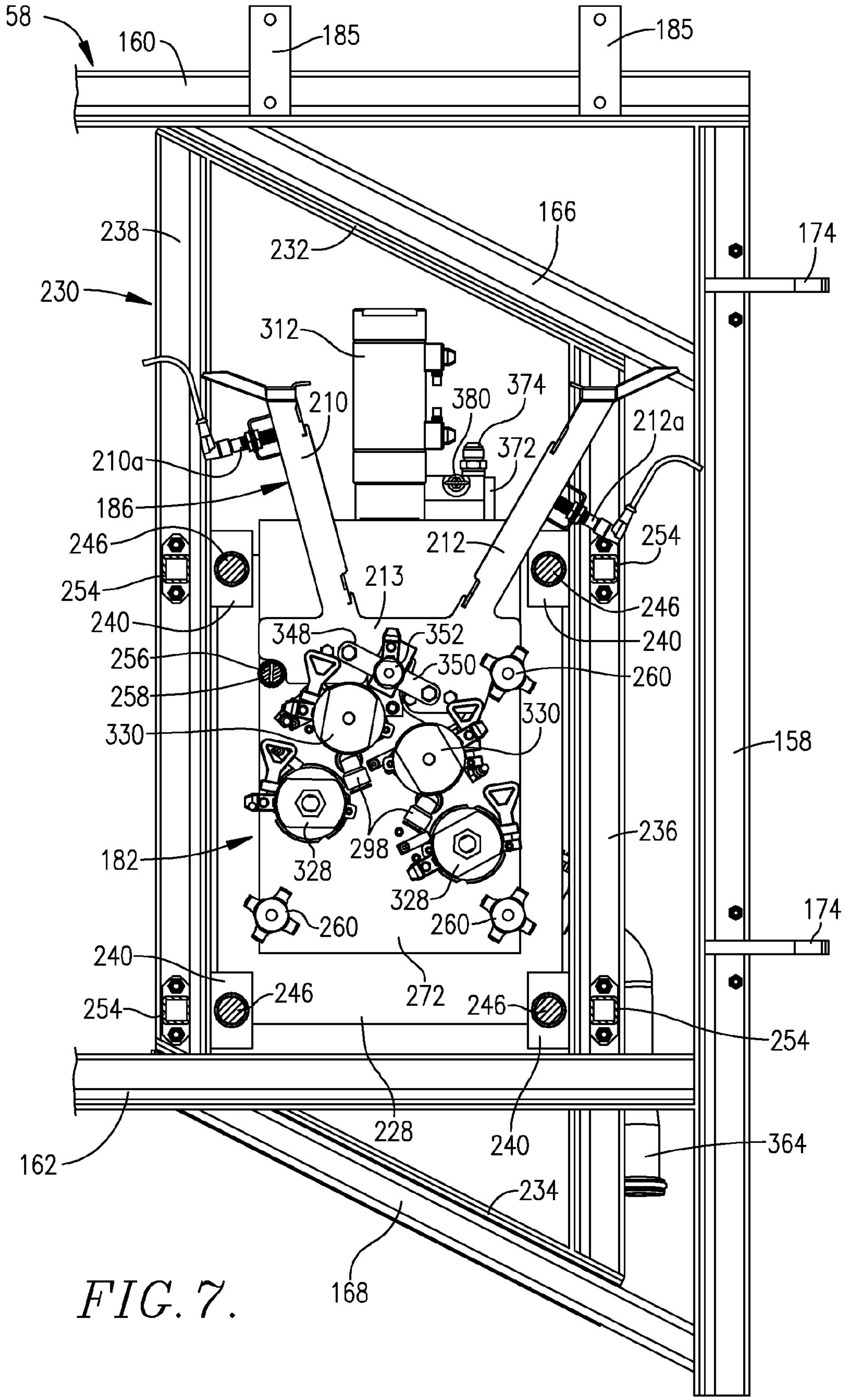
FIG. 7 is a fragmentary, vertical sectional view of the plug and meat emulsion injection assembly of FIGS. 4-6.

Referring to FIGS. 5-7, the gate assembly 58 supports control panel 60 as well as the plug and meat emulsion injection assembly 62. The gate assembly includes a rigid box frame 154 having uprights 158 with upper and lower crosspieces 160, 162. In addition, the gate assembly 58 has an adjustment mechanism 164 having a pair of stationary, inclined frame tubes 166, 168 each having a pair of spaced-apart clamping screws 170, 172 (FIG. 5). The upright 158 is equipped with a pair of latching elements 174 which mate with latches 175, attached to the right-hand corner post 74, as viewed in FIG. 3. An elongated pivot rod 176 extends between and is secured to the upper and lower crosspieces 160, 162 with the outermost ends of the rod 176 secured to the left-hand corner post 74 by couplers 177, as viewed in FIG. 3. In this fashion, the entire gate assembly 58 can be moved between a closed, operating position adjacent the input end of the cooking drum, or to an open position allowing access to the cooking drum.

The control panel 60 is secured between the upper and lower crosspieces 160, 162 by means of standoff connectors 178. The control panel 60 is itself conventional, and includes the usual digital control components for system 50. It also receives inputs from the sensors described below.

Forming Plug and Meat Emulsion Injection Assembly 62-Plug Handling Subassembly 180

Referring to FIGS. 5-6, the plug and meat emulsion injection assembly 62 broadly includes a plug handling subassembly 180 and a plug and meat emulsion injection subassembly 182. The subassembly 180 has a pair of identical, right- and left-hand plug elevators 184 leading to a common, generally V-shaped plug magazine 186. Each of the elevators 184 is connected to upper crosspiece 160 by connection blocks 185 and has a continuous roller chain 188 trained about upper and lower sprockets 190 and powered by motor 192. FIGS. 9-11 depict chain guard structure 189 is provided about the roller chain 188, as shown. Each link of the roller chain 188 supports a laterally extending lug 194. Every other lug carries a magnetic plug pickup 196 with intervening lugs supporting blanks 198. Referring to FIGS. 10 and 11, it will be seen that each pickup 196 includes a mounting plate 200, a circular magnet 202, and a plug cradle 204, these components secured together via screws 206. Each of the pickups 196 is operable to engage and hold a plug 208 delivered to the corresponding elevator by the plug recovery subassembly described below. The delivered plugs 208 are carried downwardly by the moving chain 188 and the pickups 196 to the magazine 186. The magazine 186 has a pair of upright, obliquely oriented channels 210, 212, extending upwardly from a common base 213; each of the channels 210, 212 has an inlet throat 214 and a lower, elongated, tubular plug outlet passageway structure 215 separate from base 213 and attached thereto; the passageway structure 215 is in registry with an opening 215*a*. Each throat 214 presents a plug detachment segment 216.

In order to provide enhanced automated control, the channels 210, 212 are each provided with upper and lower proximity sensors 210*a*, 210*b*. These sensors are operable to sense the presence of plugs 208 within the respective channels, and to monitor the plug output through the lower outlet passageway structures 215.

Forming Plugs 208

The preferred forming plugs 208 are illustrated in FIGS. 37 and 38. Each plug 208 has a central metallic body 218 presenting an outermost cylindrical surface 220. The body 218 is formed of an appropriate metal for magnetic handling of the plugs. In addition, the plugs 208 have endmost resilient synthetic resin caps 222, which are fastened to body 218 and have concave outboard surfaces 224. If desired, the surfaces 224 may be configured with elongated projections, so that the final formed product may exhibit the appearance of casing wrinkles found in conventionally-produced hot dog products, for example. Additionally, each of the caps 222 have an outer periphery 226, which is slightly greater than the diameter of the corresponding cooking tubes. It will be appreciated that differently sized plugs are provided for use with the smaller and larger diameter cooking tubes 94 and 96. The illustrated plugs 208 are for use with the smaller diameter cooking tubes 94.

Plug and Meat Emulsion Injection Subassembly 182

Figure 8:
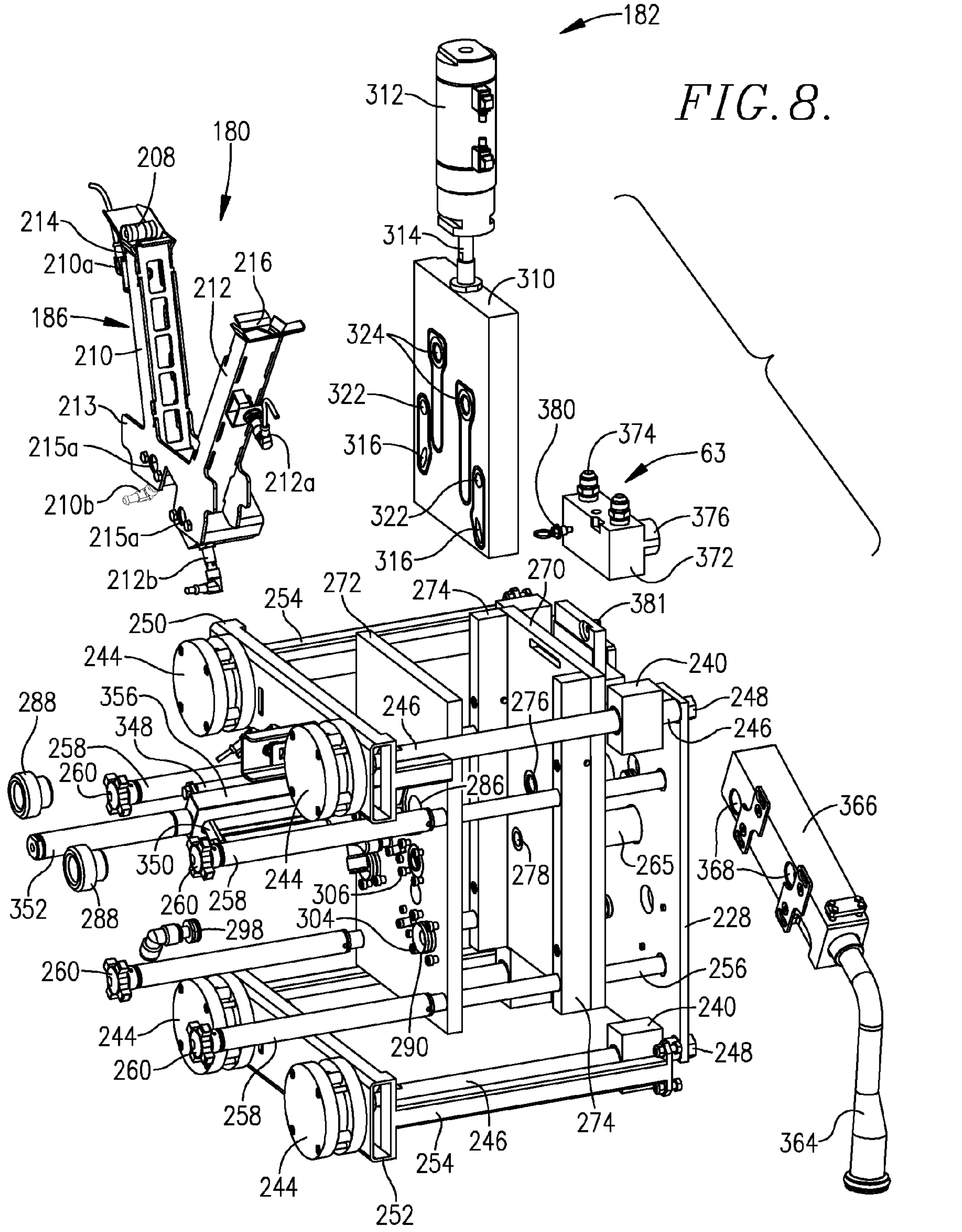
FIG. 8 is an exploded, perspective view of the plug and meat emulsion injection assembly.

FIG. 8 illustrates the assembly 182, including an upright injector support plate 228, which is secured to a slide frame 230, the latter being attached to the gate assembly frame tubes 166, 168. The slide frame 230 includes slotted upper and lower frame members 232 and 234, as well as spaced apart uprights 236, 238 (see FIG. 5). The screws 170, 172 forming a part of the gate assembly secure the slide frame 230, and thus plate 228, in alternate positions. A total of four apertured support blocks 240 are attached to the uprights 236, 238. The plate 228 is shiftable fore and aft by means of four pancake cylinders 244, each having and extendable rod 246. The position of the pancake cylinders 244 is monitored by way of proximity sensors 245 (FIG. 6). Each rod 246 extends through a corresponding support block 240 and is secured to plate 228 by bolts 248. The upper and lower pairs of pancake cylinders 244 are interconnected by means of respective support channels 250, 252. The channels 250, 252 each have an elongated support legs 254, which are affixed to the slide frame 230 and uprights 236, 238. A total of four rigid mounting rods 256 are also secured to the plate 228 and extend therefrom. The outermost end of each rod 256 is provided with a clamping sleeve 258 and a threaded, rotatable clamping knob 260.

The plate 228 has two lower meat emulsion delivery openings 262 therethough, as well as a pair of plug and meat injection openings 264. The openings 264 are designed to receive tubular delivery elements 265, each having a beveled outlet end 265*a* equipped with a sealing ring 265*b* (see FIG. 37). The inlet end of each element 265 has an annular, inwardly extending, plug-retaining shoulder 265*c* (FIGS. 37-38). The elements 265 are changed when different diameter products are being produced, as explained below. The plate 228 further has a pair of spaced apart keyhole openings 266 designed to receive respective vacuum fittings 268.

The rods 256 support a pair of upright plates 270, 272. Plate 270 includes a pair of vertical, apertured spacers 274, and also has a series of openings through the plate between the spacers 274. In particular, the plate 270 has a pair of plug and meat emulsion injection openings 276, a lower pair of meat emulsion delivery openings 278, each equipped with a stationary, tubular, projecting fitting 279, and a pair of vacuum openings 280, which receive the fittings 268. It will be observed (FIG. 28) that the vacuum openings 280 communicate with the opposite face of the plate 270.

The plate 272 has a pair of upper plug-receiving openings 286 equipped with entry ferrules 288, and a pair of lower meat emulsion conveying openings 290 with tubular beveled inserts 292 therein. The plate 272 also has a pair of injector rod openings 294 between the openings 286 and 290, and a pair of vacuum openings 296 equipped with vacuum fittings 298. The vacuum openings 296 communicate with the opposite face of plate 272. The face of plate 272 remote from plate 270 is provided with attachment screws 304, 306 to permit attachment of actuating cylinder structure, as described below.

FIG. 8 also illustrates a vertically shiftable injection head assembly 308 is located between the plates 270 and 272, and broadly includes an apertured and internally slotted plate 310 and a pneumatic actuating cylinder 312. The cylinder 312 is secured to the upper ends of the plates 270, 272, and has a downwardly extending rod 314 threaded into the upper end of plate 310. The plate 310 has a pair of lower meat emulsion conveying openings 316 and a corresponding pair of vertically offset, upper meat emulsion conveying openings 318, with each pair of openings 316, 318 connected via an internal oblique passageway 320. Additionally, the plate 310 has a pair of through openings 322 above the openings 316, and a pair of plug injection openings 324 with internal tubular inserts 326 therein.

Figure 28:
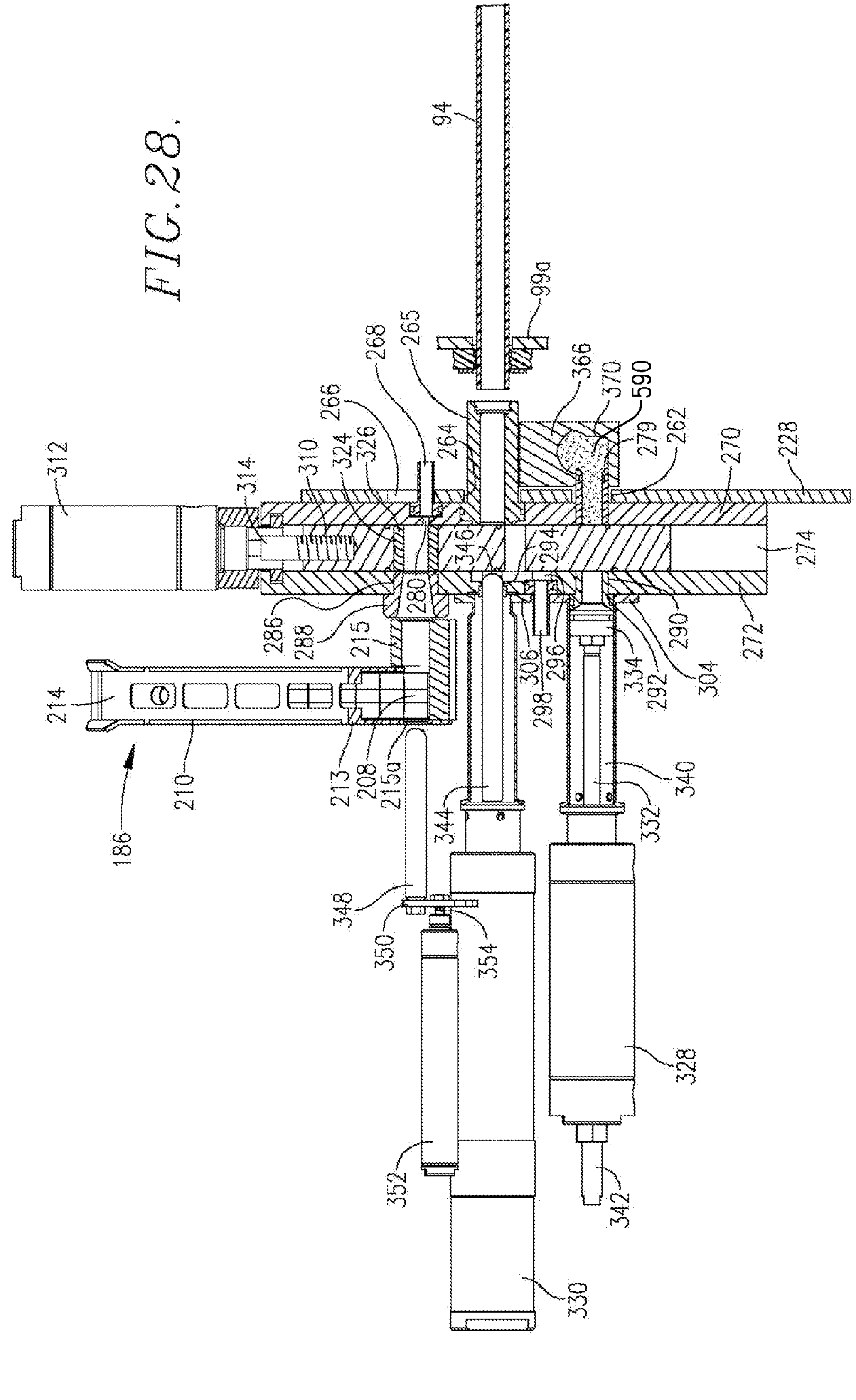
FIG. 28 is a vertical sectional view depicting the configuration of the plug and meat emulsion injection assembly in the standby position thereof while the cooking drum is indexed.

FIG. 28 illustrates a number of pneumatic actuating cylinders secured to plate 272, including a pair of meat emulsion portioning cylinders 328 aligned with the openings 290 and secured in place by the fittings 304, and a pair of plug injection cylinders 330 aligned with the openings 294 and secured by the fittings 306. Each cylinder 328 includes a shiftable rod 332 supporting a plunger head 334 equipped with sealing structure 336. A surrounding housing 338 extends between the base of the cylinder 328 and fitting 304 and defines a fluid-tight portioning chamber 340. As shown, the plunger 334 sealingly engages the housing 338 and also, in the extended position thereof, sealingly engages the associated beveled insert 292. The stroke of rod 332 is adjustable by means of stroke length control mechanism 342. Each cylinder 330 has a shiftable rod 344 terminating in a rounded end 346 which, in the retracted position thereof, is seated within the associated fitting 306 and the opening 294.

A pair of plug injection seating rods 348 are located in registry with the openings 215*a* and are supported by a crosspiece 350. A small pneumatic actuating cylinder 352 having extensible rod 354 is secured to crosspiece 350 in order to simultaneously move the rods 348. Cylinder 352 is supported on an elongated bracket 356 secured to plate 272.

As best viewed in FIG. 6, the V-shaped magazine 186 is mounted on the bracket 356 and also rests upon the upper set of rods 256. Moreover, in the operating condition of assembly 182, the clamping sleeves 258 and knobs 260 serve to hold the components of the assembly together, i.e., the sleeves 258 bear against the adjacent face of plate 272.

The assembly 282 also has a meat emulsion delivery unit 358 operable to deliver meat emulsion from a pressurized source to the system 50. Preferably, the meat emulsion is generated by a Marlen twin piston pump, although any suitable food pump may be used. The unit 358 includes a primary emulsion conduit 360 with an upstanding delivery pipe 362 (FIG. 12). An elbow conduit 364 is secured to pipe 362 and in turn is coupled with a meat delivery block 366. The block 366 is affixed to the face of plate 228 adjacent the cooking drum, and has a pair of outlet openings 368 connected by passageway 370 and communicating with conduit 364. The outlet openings 368 mate with the fittings 279 to provide a liquid-tight seal (FIGS. 28 and 34).

Water Ejection Assembly 63

Figure 41:
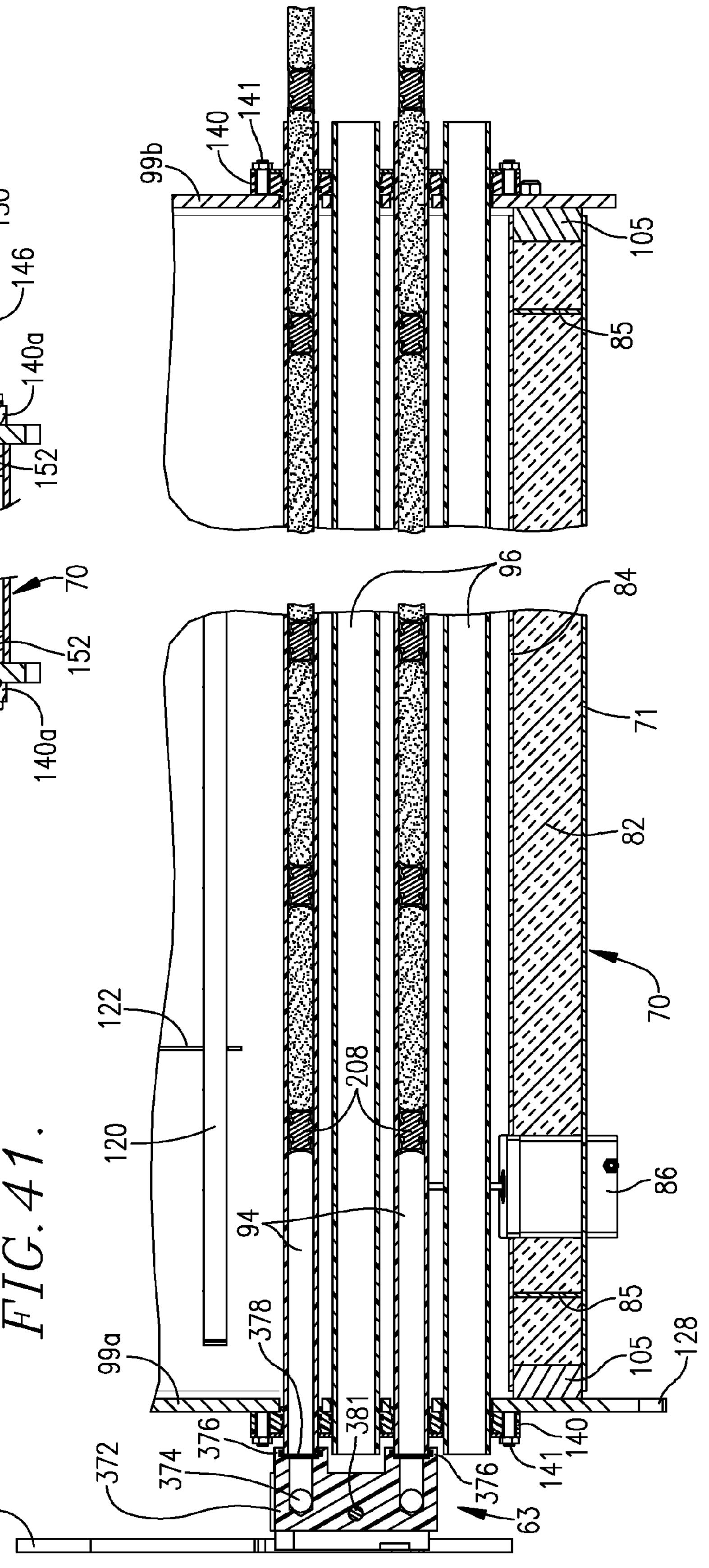
FIG. 41 is a fragmentary sectional view illustrating the operation of the water eject assembly forming a part of the processing system.

The ejection assembly 63 includes a water block 372 having a pair of water inlets 374 and a corresponding pair of tubular water outlets 376. Each outlet 376 is equipped with an o-ring seal 378 (FIGS. 5, 8, and 41). The block 372 is secured to plate 228 by means of attachment pin 380 and a vertical locating pin 381 (see FIG. 41) allowing replacement of the block when different sized products are being produced. The assembly 63 serves to remove cooked products and forming plugs 208 from the cooking tubes by injection of hot water or oil, as will be explained below.

Output Conveyor 64

Figure 26:
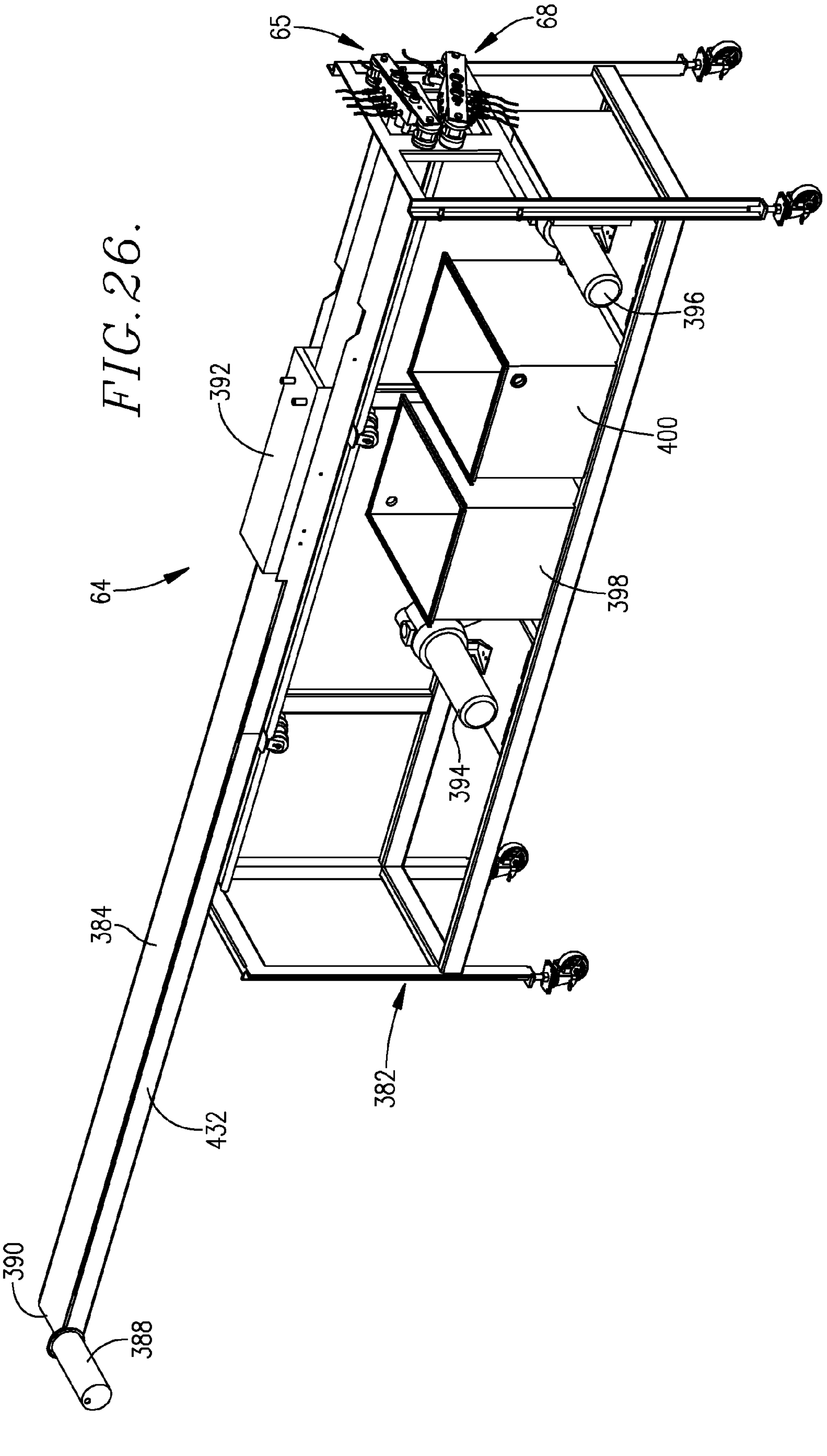
FIG. 26 is a perspective view of the output assembly forming a part of the processing system.
Figure 27:
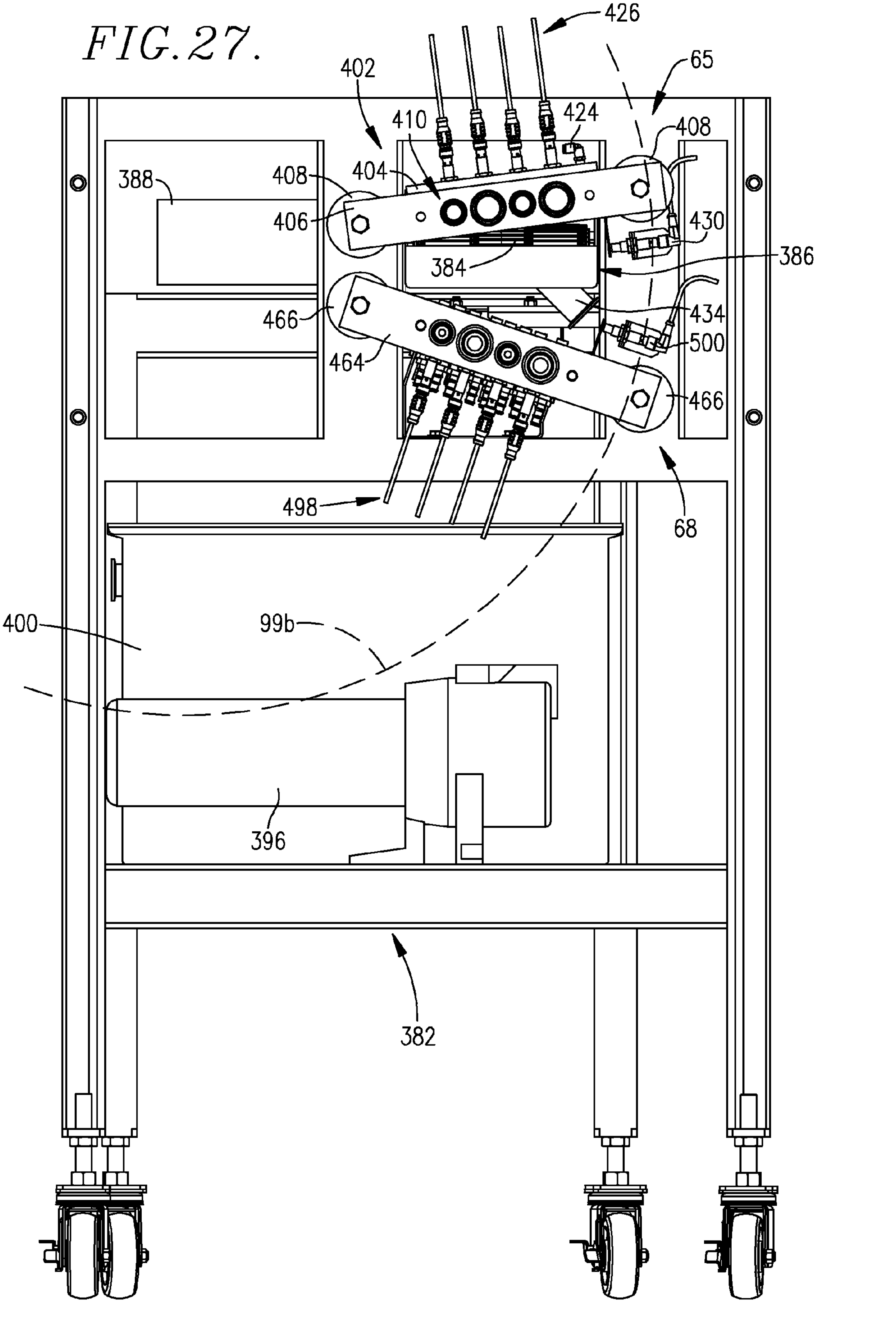
FIG. 27 is an end view of the output assembly.

Referring to FIGS. 2, 26, and 27, the output conveyor 64 includes a frame 382 and an elongated, endless, draining wire conveyor belt 384. The frame 382 is designed to be bolted to the output end of frame 72. The belt 384 is powered by means of motor 388 and is operable to deliver cooked product to the outlet end 390 thereof. One or more intermediate spray heads (not shown) are positioned above belt 384 and beneath a spray housing 392. The spray head(s) are operably coupled with a pump 394 in order to deliver liquid (e.g., vinegar) to the heads from a storage tank 398. In addition, an oil pump 396 is provided, along with an oil tank 400, in order to supply vegetable oil to the assembly 68.

A trough 432 extends the full length of conveyor 64 below the lower run of belt 384 and has three section sections: a first water collection section adjacent the forward end of the frame 382; a second vinegar collection section separated from the first section by a baffle plate; and third section separated from the second section by another baffle plate and terminating at an open end adjacent output end 390 of the conveyor. The first water collection section of the trough 432 has an oblique discharge outlet 434. The outlet 434 is typically equipped with a discharge hose or similar device for water disposal purposes. The second vinegar collection section also has an outlet similar to the outlet 434.

Finished Product and Plug Delivery Assembly 65

Figure 43:
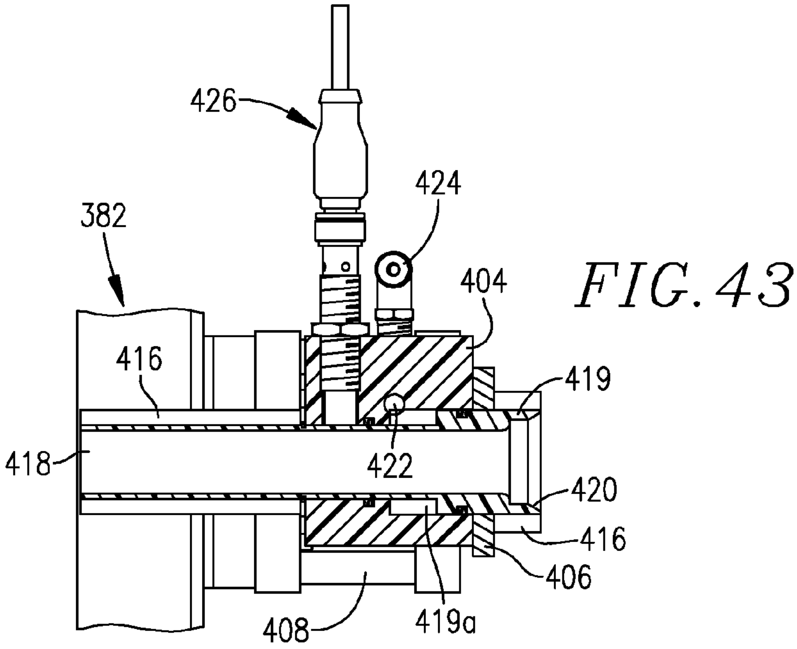
FIG. 43 is a fragmentary, vertical sectional view illustrating an air cushion assembly at the outlet end of a cooking tube.

FIG. 27 illustrates the finished product and plug delivery assembly 65 comprising mechanism 402 mounted on frame 382 and operable to successfully deliver cooked products and plugs onto belt 384. The mechanism 402 includes a block 404 secured to a shiftable plate 406. The plate is in turn supported by a pair of pancake cylinders 408 affixed to frame 382. The block carries an array 410 of four tubular outlets 412-418 sized and designed to mate with an array 92 of cooking tubes. The input ends 419 of the outlets 412-418 are situated within an enlarged opening 419*a* and present a beveled surface 420 (see FIGS. 43 and 47), whereas the outlet ends thereof closely overlie the upper run of belt 384. A common bore 422 is provided for the outlets 412-418, located to communicate with the corresponding enlarged opening 419*a*. An air inlet fitting 424 is secured to block 404 and communicates with the bore 422, so as to maintain a slight positive pressure within the openings 419*a*. This gives a slight cushioning effect when the input ends 419 mate with the corresponding cooking tubes 94, 96.

Figure 47:
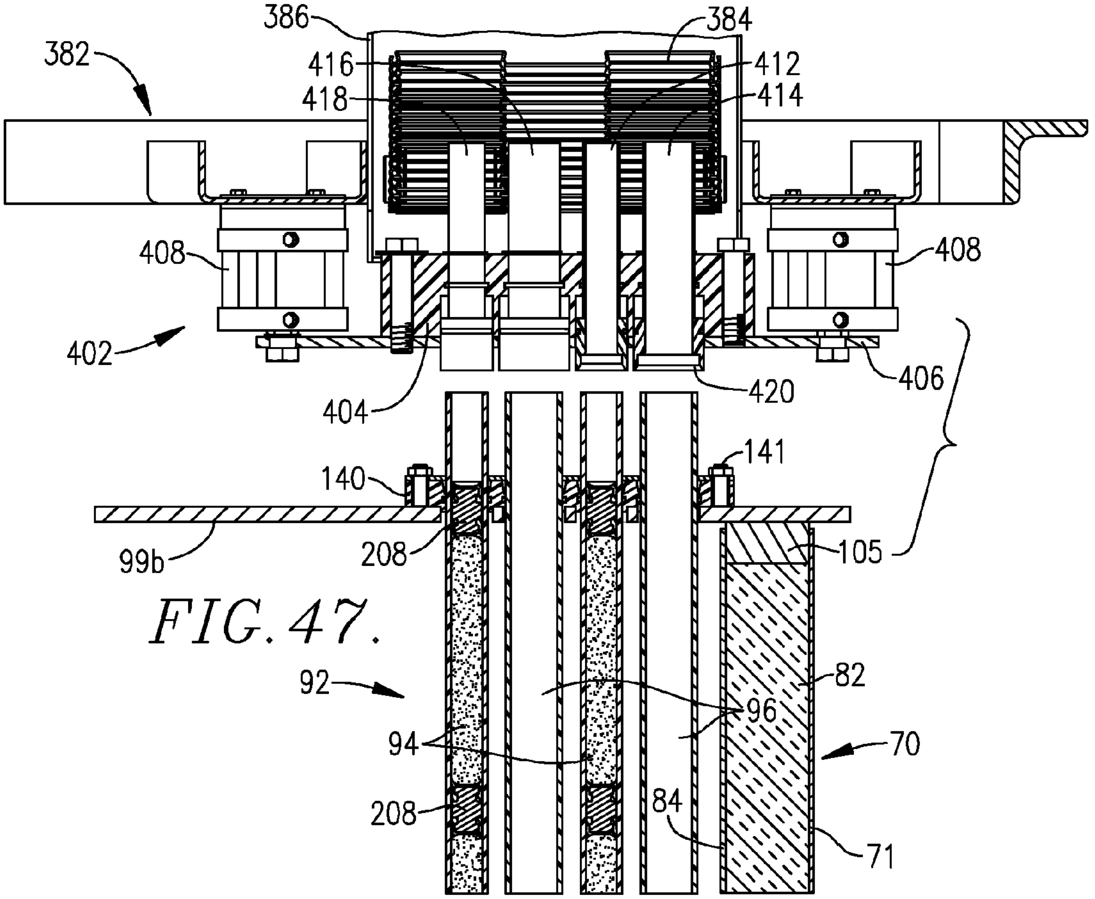
FIG. 47 is a sectional view illustrating the output end of the cooking tubes and the product and plug delivery assembly, with the latter in a standby mode during indexing of the cooking drum.
Figure 48:
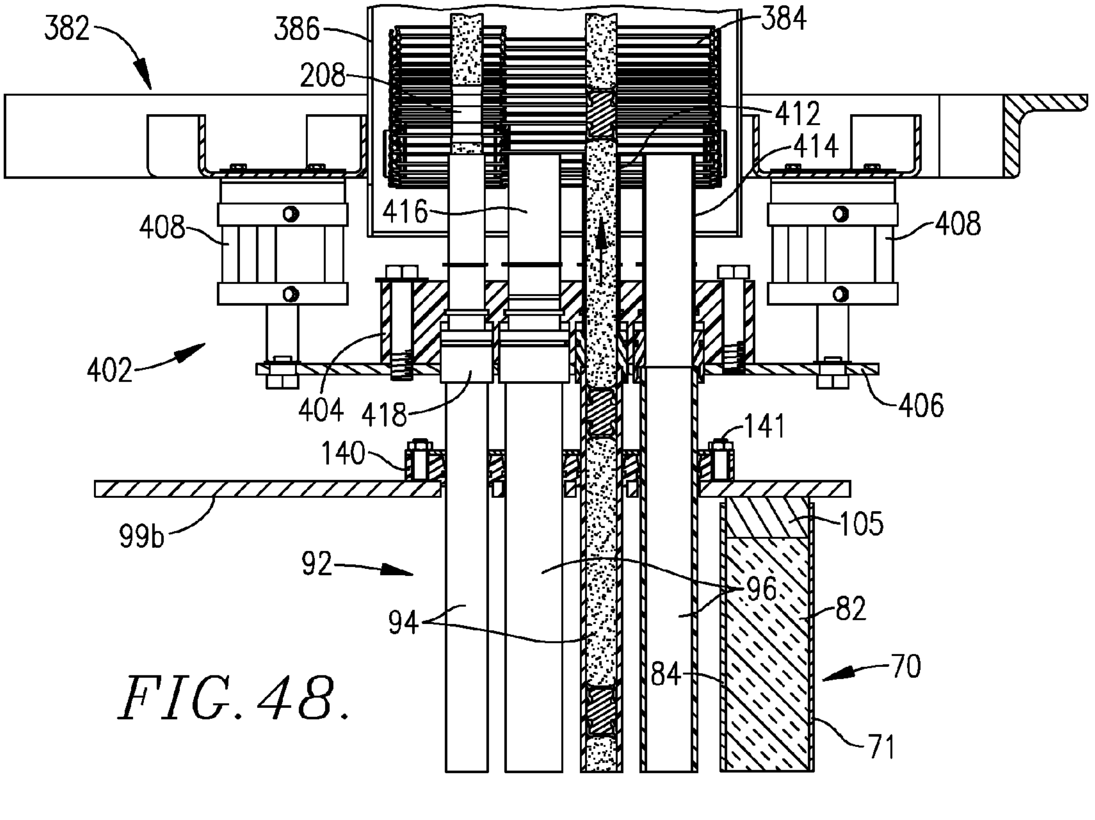
FIG. 48 is a view similar to that of FIG. 47, but illustrating the product and plug delivery assembly engaged with the output ends of the cooking tube, during delivery of cooked products and plugs.

The block 404 and tubes 412-418 are shiftable between a standby position (FIG. 47) and an operating position (FIG. 48). A series or proximity sensors 426 are secured to block 404 in order to count the plugs 208 from the tube array. In addition, a proximity sensor 430 is provided so as to monitor the position of the pancake cylinders 408.

Plug Recovery Assembly 66

The plug recovery assembly 66 includes a driven wire belt 438 having an inclined stretch and a horizontal stretch. The belt 438 is trained about a lower roller 440 and a mating upper roller (not shown). The roller 440 has a magnetic core serving to magnetically pick up the plugs 208 as they travel along the length of belt 438 after exiting mechanism 402, and thus separates the plugs from the finished product. The plugs are then conveyed upwardly and horizontally as shown. A portion of the belt 438 passes through the housing 442 where a wash/drain assembly is provided for washing the plugs as they travel through the housing 442. This wash/drain assembly is an optional feature of the system 50.

Figure 18:
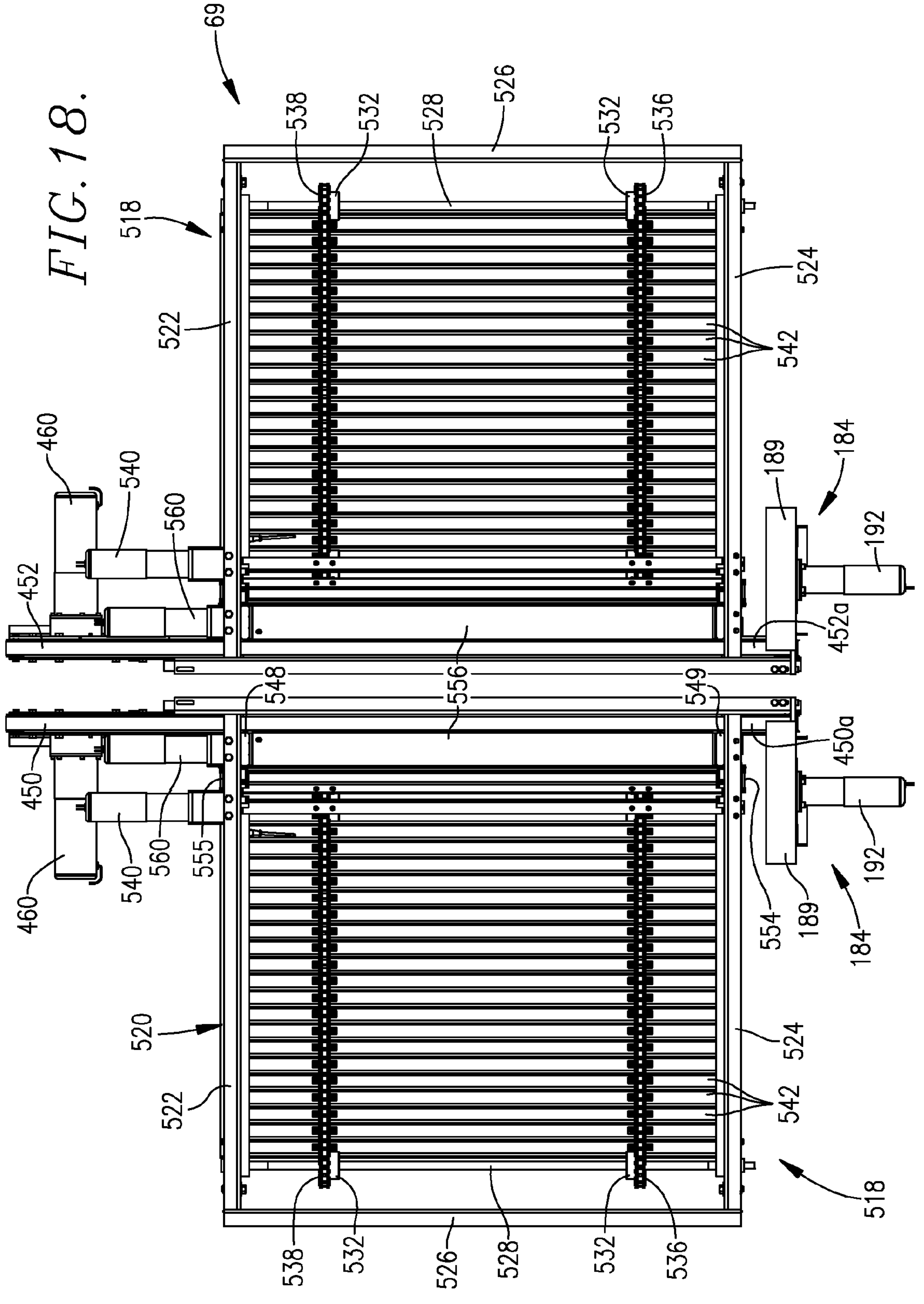
FIG. 18 is a plan view of the plug storage racks of the processing system.
Figure 19:
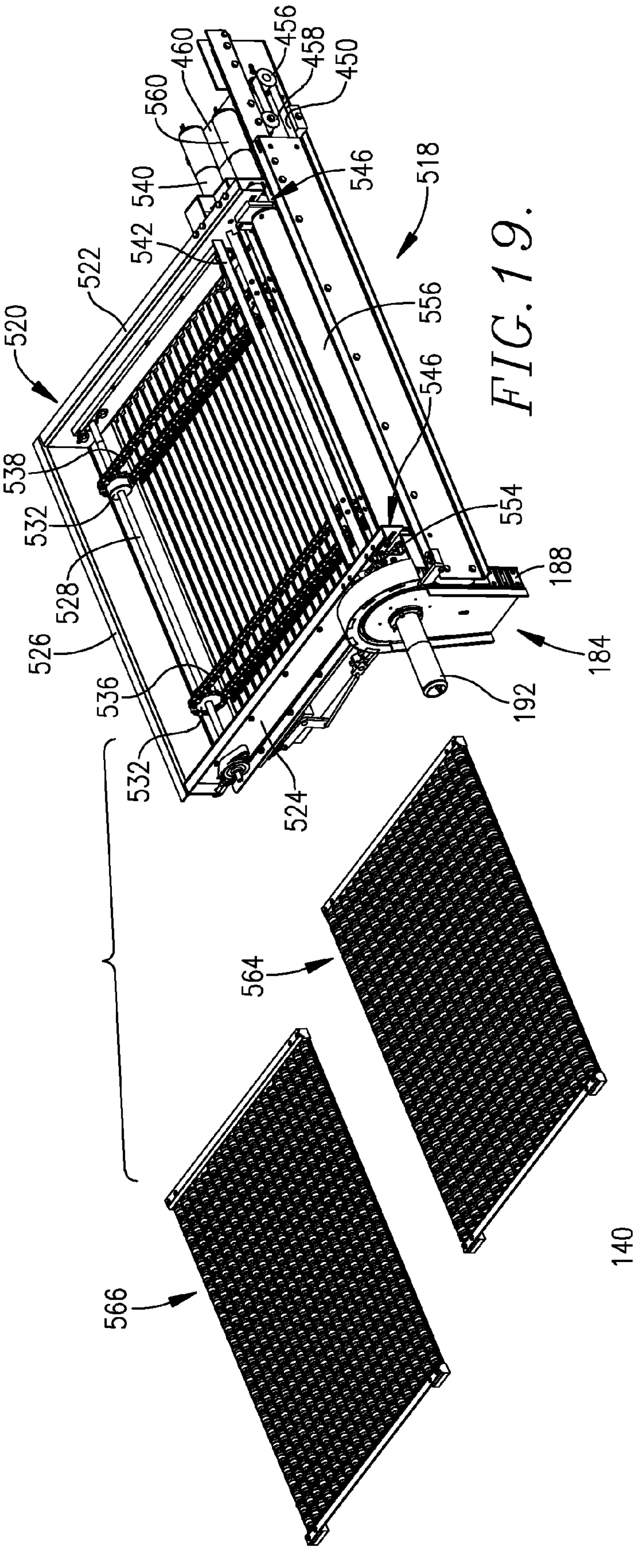
FIG. 19 is a perspective view of one of the storage racks, and illustrating plug-holding supports for both small and large plugs.

A pair of laterally spaced apart plug conveyors 450, 452 are provided downstream of the horizontal stretch of belt 438 and receive the plugs from the latter. Each conveyor 450, 452 has a pair of vertically spaced apart forward rollers 454, a rearmost driven roller 456, and an idler roller 458. A motor 460 is provided to power each of the belts 450, 452. The upper runs 450*a*, 452*a* convey the plugs 208 toward and into the corresponding elevators 184, where they are picked up by the magnetic pickups 196 carried on the roller chains 188 (see FIG. 18).

Oil Application Assembly 68

Figure 42:
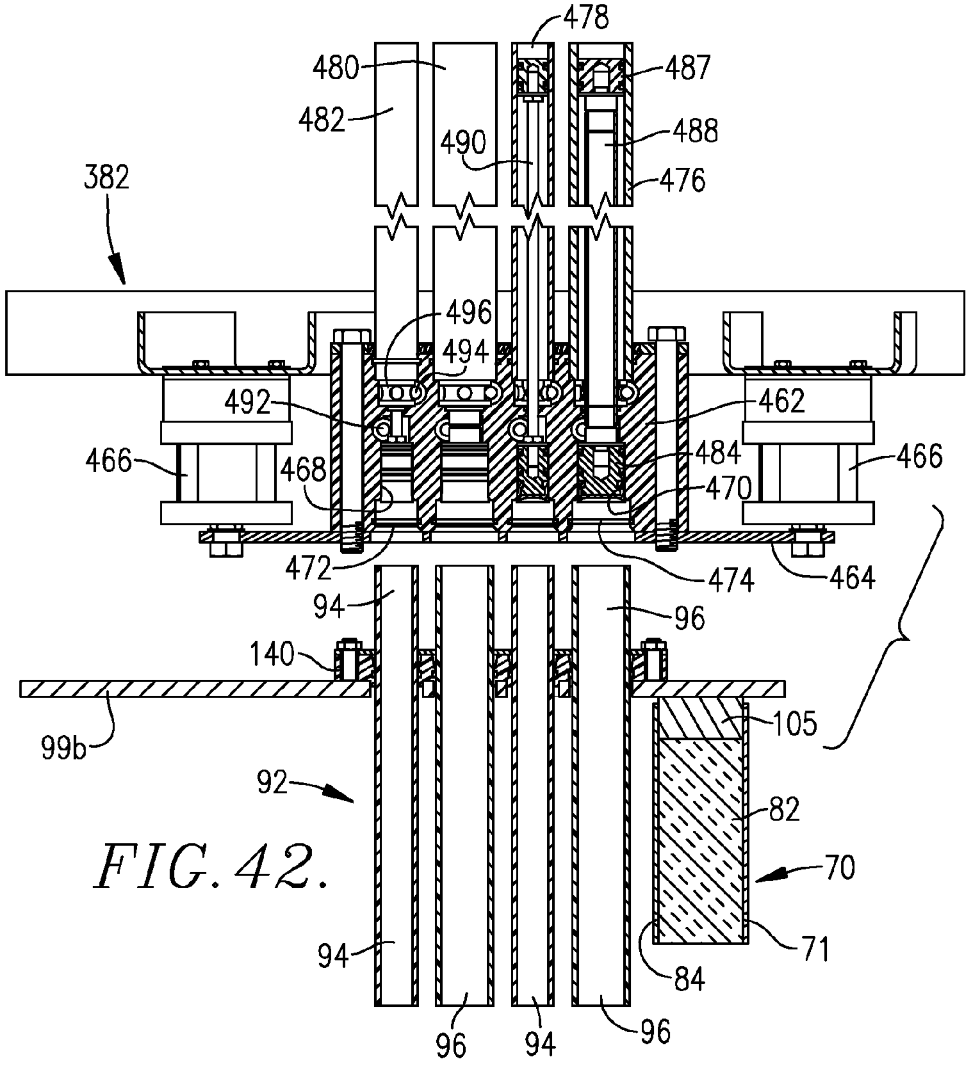
FIG. 42 is a fragmentary, sectional view illustrating the components of the oil application assembly forming a part of the processing system, with the oil injection system in its standby mode.

FIG. 42 illustrates the assembly 68, which is designed to deposit a thin film of a 2:1 volumetric mixture of lecithin and vegetable oil along the inner surfaces of each of the cooking tubes 94, 96 prior to filling thereof. The assembly 68 is carried adjacent the front end of conveyor frame 382, and includes a synthetic resin block 462 secured to a cross plate 464, the latter being supported by a pair of pancake cylinders 466 attached to the frame 382. The block 462 has four laterally spaced apart bores, with two of the bores 468 in alignment with and sized for communication with the smaller diameter tubes 94 of a tube array 92; the other two bores 470 are in alignment with and sized for communication with the larger diameter tubes 96 of the array 92. The inlet ends 472 of the bores 468 are configured to mate with the output ends of the tubes 94, and similarly the inlet ends 474 of the bores 470 mate with the output ends of the larger diameter tubes 96. Four rearwardly extending oil tubes 476-482 are secured to the rear face of block 462, and communicate with the bores 468, 470. As best seen in FIGS. 42 and 44, the oil tubes 476 and 480 are of large diameter, while the tubes 478 and 482 are of smaller diameter.

An elongated rod assembly is situated within each of the tubes 476-482 and includes a forward most swab piston 484 associated with the larger diameters tubes 476 and 480 and a smaller diameter piston 486 associated with the smaller diameter tubes 478, 482. Elongated rods 488 extend rearwardly from the swab pistons 484, and likewise elongated rods 490 extend rearwardly from the swab pistons 486. Each rod has a piston 487 of appropriate diameter secured to the rearmost end thereof. The tubes 476-482 and internal rods 488, 490, are of essentially the same length as the cooking tubes 94, 96 and these components extend rearwardly below the lower run of conveyor belt 384.

The block 462 includes four oil inlet passageways 492 coupled with nipple 493, each located adjacent the rear face of a swab piston 484, 486. The block also has four other oil inlet passageways 494 coupled with nipple 495 spaced rearwardly of the corresponding inlets 492. A stationary, apertured bushing 496 of appropriate diameter is situated within each of the bores 468, 470 immediately in front of the rearwardly-extending tubes 476-482.

In order to maintain automated control, four proximity sensors 498 are provided for the bores 468, 470, and a sensor 500 is provided to sense the condition of the pancake cylinders 466.

As best seen in FIGS. 45 and 46, the block 462 has an apertured rear plate 508 which receives the tubes 476-482. In order to provide an oil-tight seal about each of the tubes, the block 462 has o-rings 510 and the rear plate 508 is notched as at 512 about each tube. An annular seat 514 is within each notch 512, and mates with an annular, compressible seal 516.

Plug Storage Assembly 69

During production runs using the system 50, the plugs 208 are continuously reused as cooked product is produced. However, at the end of a production run during cleanup, or when a different sized product is to be produced, the plugs 208 are conveniently stored for subsequent use. To this end, a plug storage assembly 69 is provided above the cooking drum assembly 56, close to the input end thereof. In general, the assembly 69 has a pair of left- and right-hand storage units 518. Inasmuch as the units are identical, only the left-hand unit 518 will be described in detail.

In particular, the unit 518 includes a box frame 520 presenting sidewalls 522, 524 and an end wall 526. A pair of transverse shafts 528 and 530 extend along the length of the unit within box frame 520. Each of the shafts 528, 530 has a pair of sprockets 532, 534 thereon, which support a pair of laterally spaced roller chains 536, 538. A drive motor 540 is operably coupled with shaft 530 in order to move the roller chains 536, 538. A plurality of elongated, generally L-shaped flights 542 are attached to aligned links of the roller chains 536, 538, and extend the full lateral distance between sidewalls 522, 524. The outwardly extending segments 544 of the flights 542 are sized to engage and convey a row of plugs 208, as later described.

Figure 22:
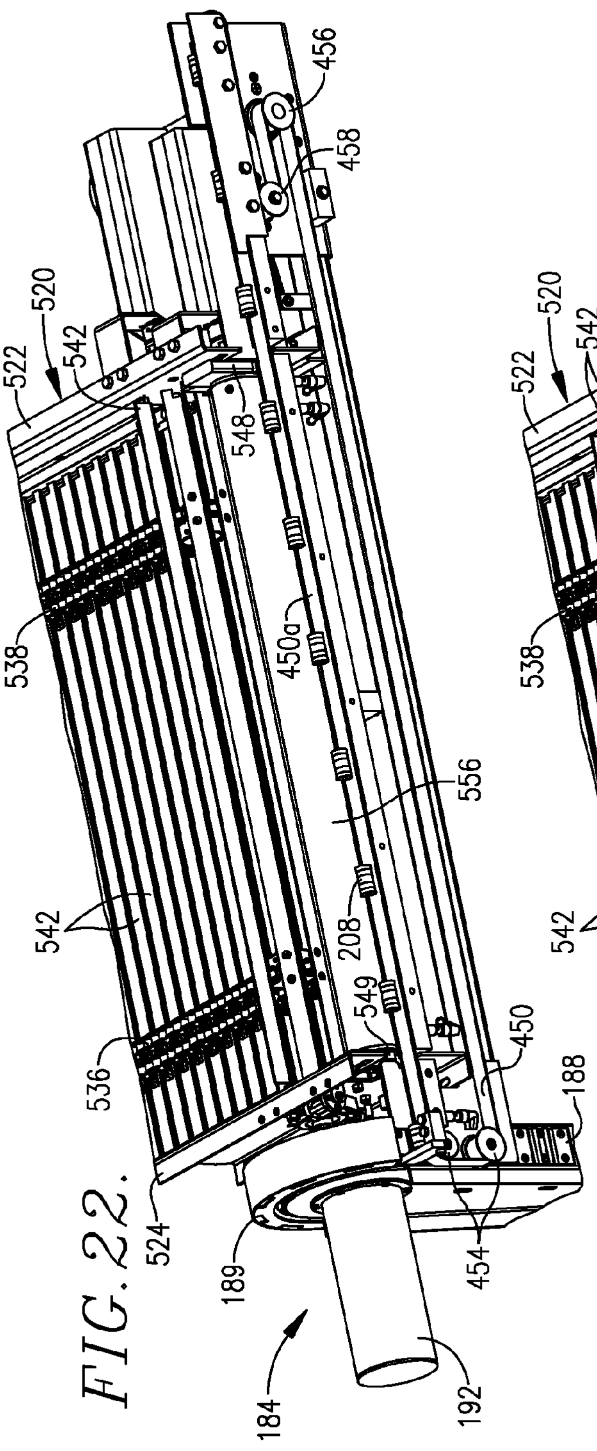
FIG. 22 is a fragmentary perspective view illustrating the progression of plugs through the plug storage assembly and into the plug and meat emulsion injection assembly.
Figure 23:
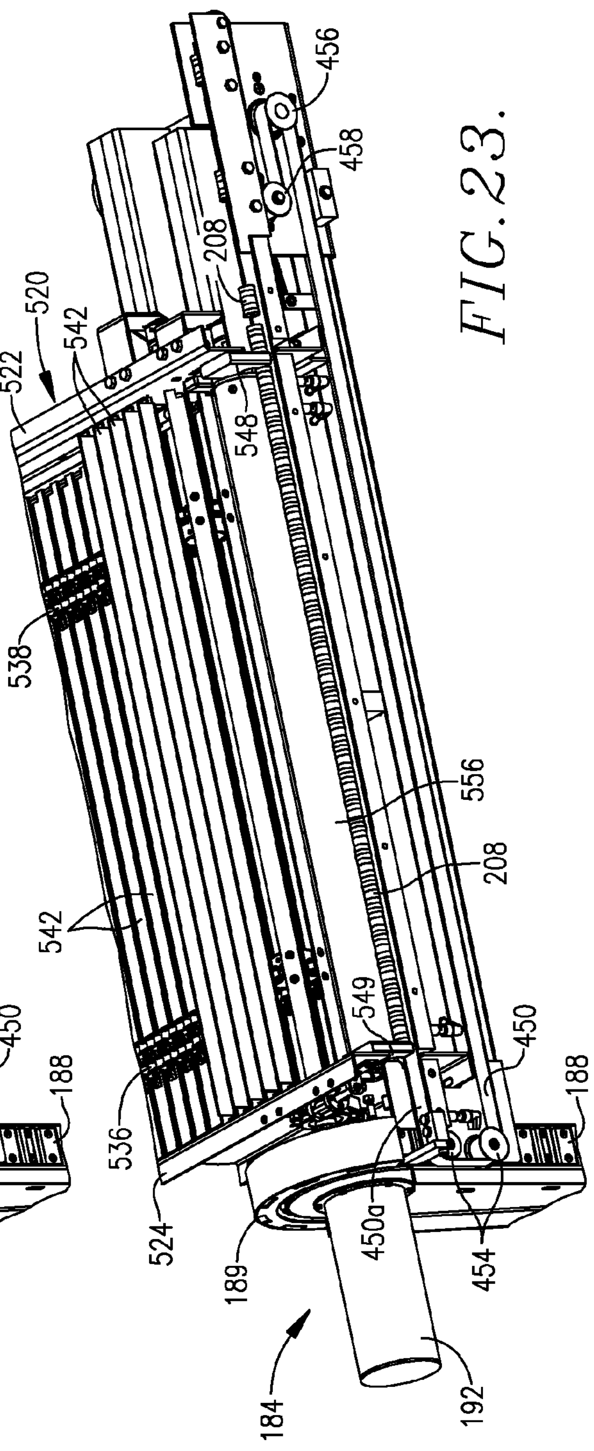
FIG. 23 is a fragmentary perspective view similar to that of FIG. 22, but illustrating the initial operation of plug storage.
Figure 25:
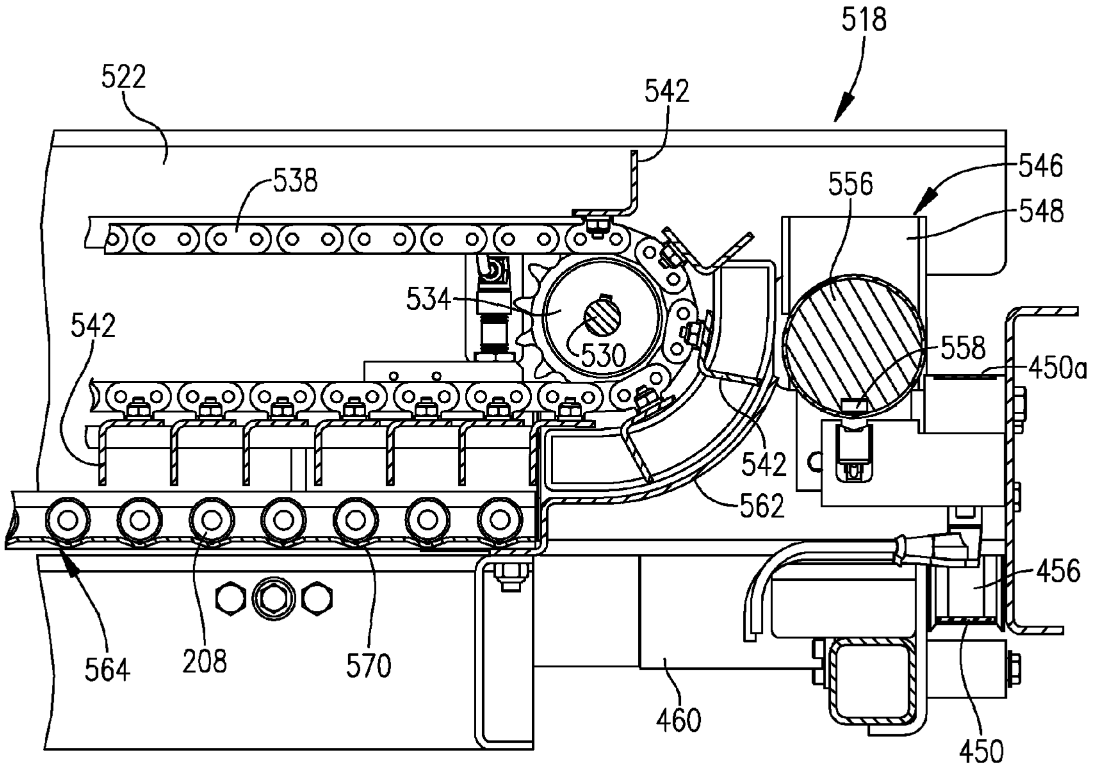
FIG. 25 is a fragmentary, vertical sectional view similar to FIG. 24, illustrating the completion of plug storage with the storage rack lowered.

The box frame 520 also is equipped with a gate mechanism 546 comprising a pair of individually shiftable gates 548, 549. Each gate 548, 549 has a mounting element 550 within a corresponding slot 552 respectively adjacent the inner surfaces of the side walls 522, 524. The gates are individually movable by means of a small pneumatic piston and cylinder assembly 554, 555. In the retracted position of the gate mechanism (FIG. 22), the gates 548, 549 are located out of blocking relationship to the belt run 450*a* (FIG. 25).

The unit 518 also includes a magnetic pickup roller 556, which is situated adjacent belt run 450*a* and has a row of magnets 558 each operable to pick up a respective plug 208 of a row thereof. The roller 556 is mounted between the gates 548, 549 as shown, and rotates by means of motor 560. An arcuate plug retainer guide wall 562 extends from the periphery of roller 556 remote from belt run 450*a* downwardly to a rack loading location.

Figure 20:
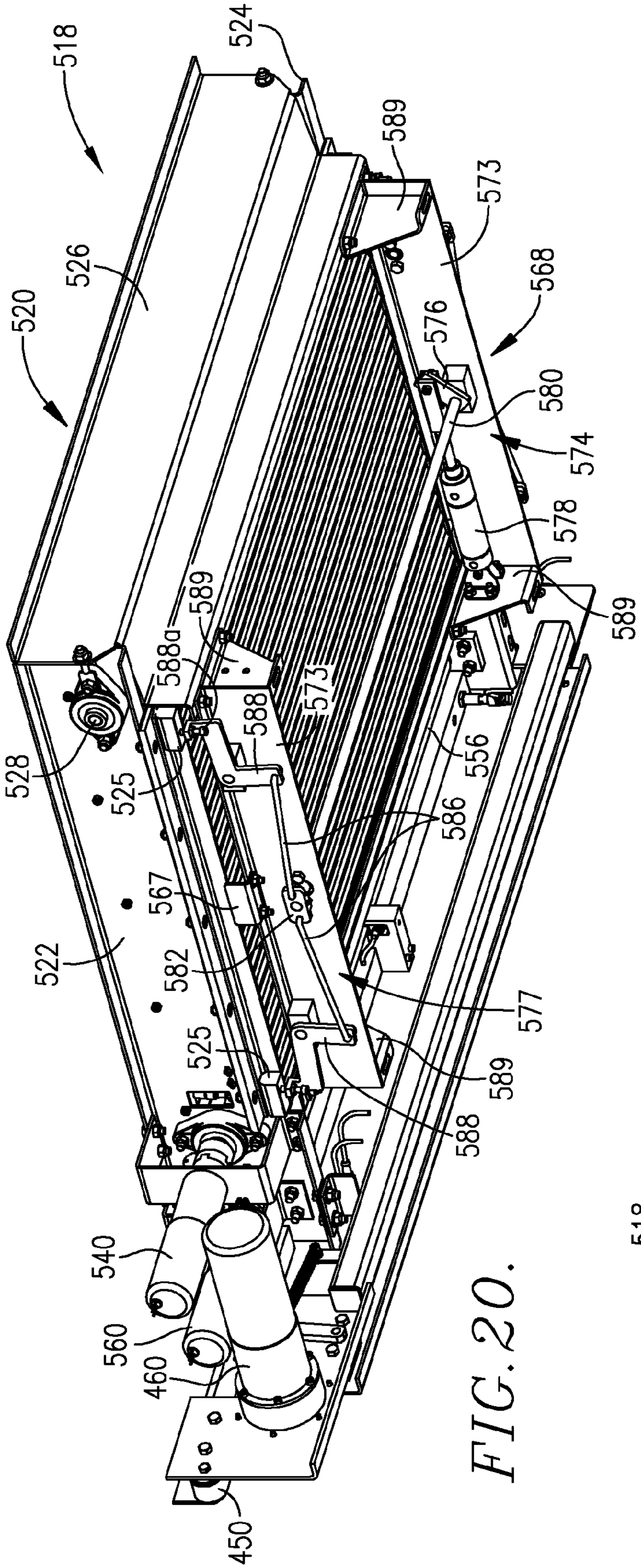
FIG. 20 is a perspective view of a plug storage rack, viewing the underside thereof.
Figure 21:
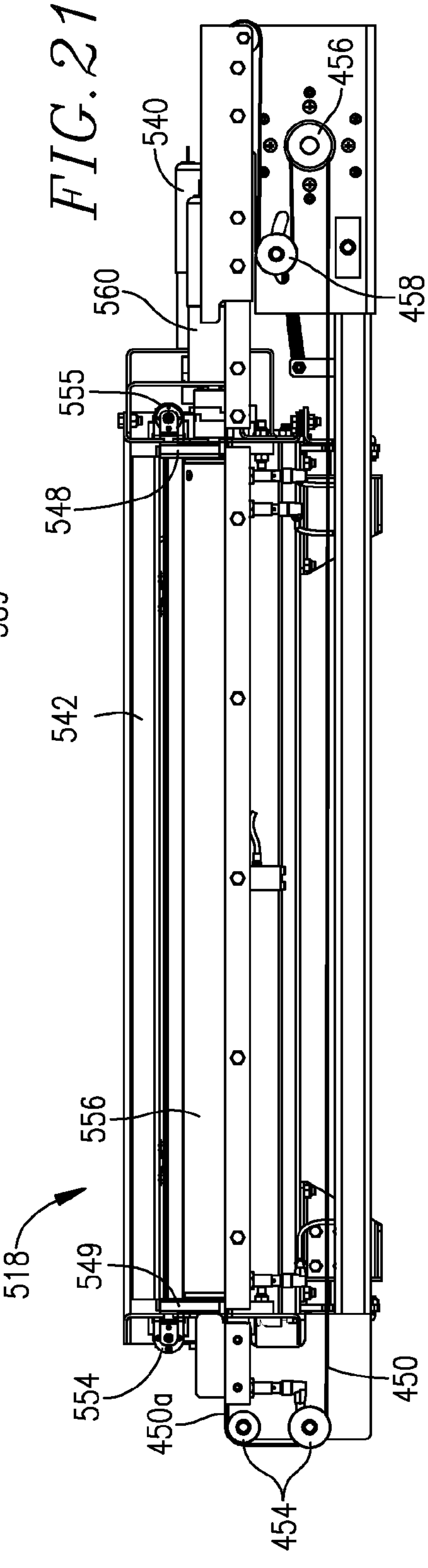
FIG. 21 is an end elevational view of a plug storage rack.
Figure 24:
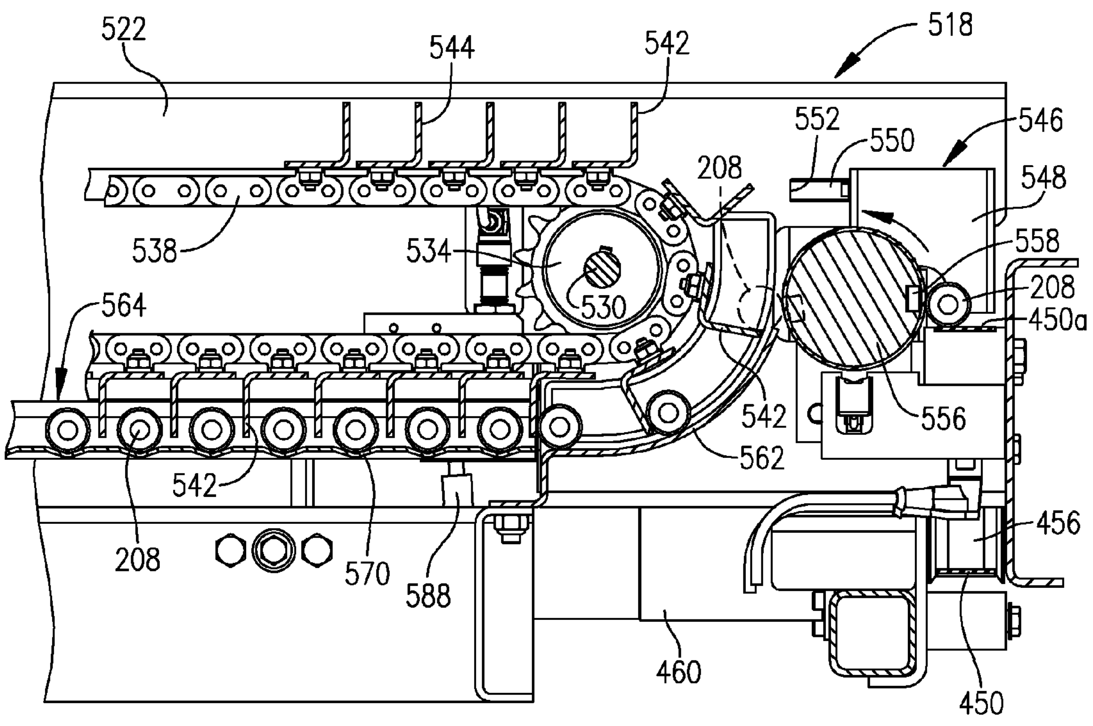
FIG. 24 is a fragmentary, vertical sectional view illustrating the second step of plug storage, wherein a row of plugs is elevated and delivered to the plug conveyor.

The unit 518 is equipped with a plug rack 564 or 566 for receipt of smaller or larger diameter plugs 208. The selected rack is supported beneath the roller chains 536, 538 by means of a rack elevator assembly 568. As best seen in FIGS. 24-25, the rack 564 presents a series of spaced apart plug-storing recesses 570 extending between the sidewalls 522, 524, as well as corner blocks 525 mounted to the underside thereof. The assembly 568 includes a pair of opposed, depending walls 573 and a crank mechanism 574 operable to selectively raise and lower a rack 564 or 566. The foreground wall 573 illustrated in FIG. 20 supports an upstanding rack stop 567. The mechanism 574 includes a lever 576 mounted on a depending wall 573 and is operated by means of pneumatic cylinder 578. An elongated pivot rod 580 extends between the walls 573 and is coupled with lever 576. A pair of linkages 577 are mounted on the outer face of each wall 573 and are coupled with rod 580. Each linkage includes a coupler 582 secured to the outer end of the rod 580, with a pair of elongated linkage rods 586 secured thereto. Each linkage rod 586 is in turn connected with a pivotally mounted crank 588 having an outermost adjustment screw 588*a* located below the respective corner blocks 525. The underside of the unit 518 also has four corner-mounted connection walls 589, which permit attachment of the unit 518 to frame assembly 72. As illustrated, the cylinder 578 is secured to the inner surface of one of the walls 589.

The unit 518 is also provided with proximity sensors 589*a* to facilitate control thereof during operation, as described below.

Operation

In the ensuing discussion, the production of hot dog products using system 50 will be described, wherein only the small diameter cooking tubes 94 are employed. Hence, the larger diameter tubes 96 are not used for any purpose. For such operation, the gate assembly is closed and latched with slide frame 230 is in the upper position thereof as depicted in FIG. 5, and the strokes of the cylinders 328 are adjusted via mechanisms 342 to deliver the proper portions of meat emulsion. Small diameter change parts are also installed, namely the delivery elements 265, vacuum fittings 268, water block 372, plug magazine 186, entry ferrules 288, and inserts 326 of plate 310; and if the plug storage assembly 69 is to be used, the small plug racks 564 are installed.

In general, the operation of system 50 involves continuous cooking and plug recovery, with intermittent indexing movement of the cooking drum assembly 56. When the drum assembly 56 is stationary after each increment of rotation, three individual operations occur substantially simultaneously, namely (1) filling of empty and previously oiled small diameter tubes 94 of an array 92*a* with injection of successive charges of meat emulsion and forming plugs 208; (2) oiling of empty tubes 94 in an array 92*b* immediately adjacent and upstream of the array 92*a* being filled; and (3) ejection of cooked product and plugs from the tubes 94 of another array 92*c* spaced two arrays from the array 92*b*.

Cooking occurs owing to the fact that the housing 70 is filled with water, with steam injection into pipe 114, so that the steam travels through the stems 118 and the steam tubes 120. This serves to inject steam into the surrounding water so as to heat the latter and thus effect cooking of product within the tubes 94. The temperature probes 86 are continuously monitored in order to maintain proper cooking temperatures within the housing 70 As indicated, this cooking step occurs continuously during operation of system 50.

It is next assumed that the cooking drum has been indexed to a new incremental position by the operation of indexing drive 130, while the assemblies 63, 65 and 68, and subassembly 182, are in their standing positions spaced from the ends of the cooking tubes (see FIGS. 42 and 47). This involves operation of cylinder 132 to withdraw fixture 136 from the initial tooth, whereupon the cylinder pivots downwardly in an orientation such that fixture 136 can engage the next tooth. The cylinder is again operated to extend the fixture to engage the next tooth, with consequent pivoting or the locking element 137 until the latter comes into engagement with the initial tooth When the drum is thus indexed, the output ends of the cooking tubes 94 of array 92*c* filled with fully cooked product and intermediate forming plugs 208 are immediately adjacent the finished product and plug delivery assembly 65, i.e., the output ends of tubes 94 are in alignment with the input ends 419 of the smaller diameter tubular outlets 414, 418. Additionally, the input ends of the tubes 94 of array 92*c* are immediately adjacent the water outlets 376 of water ejection assembly 63. The empty tubes 94 of array 92*b* are in alignment with the smaller diameter bores 472 of oiling assembly 68. Finally, the outlet ends of the empty tubes 94 of array 92*a* are in alignment with the delivery elements 265 of the plug and meat emulsion injection subassembly 182.

Next, the pancake cylinders 244 of subassembly 180 are actuated in order to shift the latter towards housing 70 until the open ends of the delivery elements 265 come into mating engagement with the inlet ends of the cooking tubes 94 of array 92*a* (FIG. 35), and the water outlets 376 are similarly engaged with the inlet ends of the tubes 94 of array 92*c* (FIG. 41). At substantially the same time, the pancake cylinders 408 and 466 of the assemblies 65 and 68 are actuated, which serves to shift these assemblies toward the outlet end of the housing 70. This causes the outlets 414, 418 to come into mating engagement with the output ends of the tubes 94 of array 92*c*, and the ends of the bores 472 to matingly engage the output ends of the tubes 94 of array 92*b*.

Ejection of cooked product and plugs 208 from the tubes 94 of array 92*c* is accomplished by directing pressurized water from block 372 and outlets 376 into these tubes behind the closest plugs 208 (FIG. 41). The product and plugs 208 thus progressively pass through the tubes 94 and 414, 418, and are ultimately deposited onto moving conveyor 384. This moves the cooked product away from housing 70 and towards output end 390 of the conveyor for further processing or packaging. If desired, the products may be sprayed with a substance in order to assist with skin formation and/or color development in the cooked product (e.g., acetic acid or white vinegar) or the like in the spray housing 392. The intermediate plugs 208 are handled by the subassembly as described hereafter. At the end of the product and plug ejection sequence, the water within the tubes 94 of array 92*c* passes out of the tubes and descends though the conveyor 384 where it is collected in trough 432 and disposed of through outlet 434.

Oiling of the tubes 94 of array 92*b* is effected by directing a pressurized mixture of lecithin and vegetable oil though the nipple 493 of block 462 for passage through inlets 492 immediately behind the swab pistons 486. This progressively moves the swab pistons through the length of the tubes 94 (FIG. 44), and simultaneously pulls the rods 490 from the oil tubes 478, 482 until the rearmost pistons 487 seat within the block 462 (FIG. 45). At this point the forward faces of the pistons 487 are adjacent the oil outlets 494. Pressurized lecithin/oil is introduced through the outlets 494, which causes rearward movement of the pistons 487 and consequent retraction of the rods 490 and swab pistons 486 to the original positions thereof. This in turn creates a very thin film of lecithin/oil on the inner surfaces of the tubes 94 of the array 92*b*, which assists in filling thereof with meat emulsion and plugs 208 when the housing 74 is indexed to the next position. It will be appreciated that lecithin/oil application may not be required if the cooking tubes are formed of other types of materials.

Referring now to FIGS. 28-33, the sequential operation of the plug and meat emulsion injection subassembly 182 is illustrated, depicting the filling of the tubes 94 of array 92*a* from the beginning and through a complete cycle. It will be understood in this respect that these tubes have been previously oiled, as described above, and are ready to be filled with the plugs 208 and meat emulsion portions. FIG. 28 illustrates the subassembly 182 in its standby mode, with a series of plugs 208 located within each of the channels 210, 212 of magazine 186, and with meat emulsion 590 within the passageways of block 366.

Figure 29:
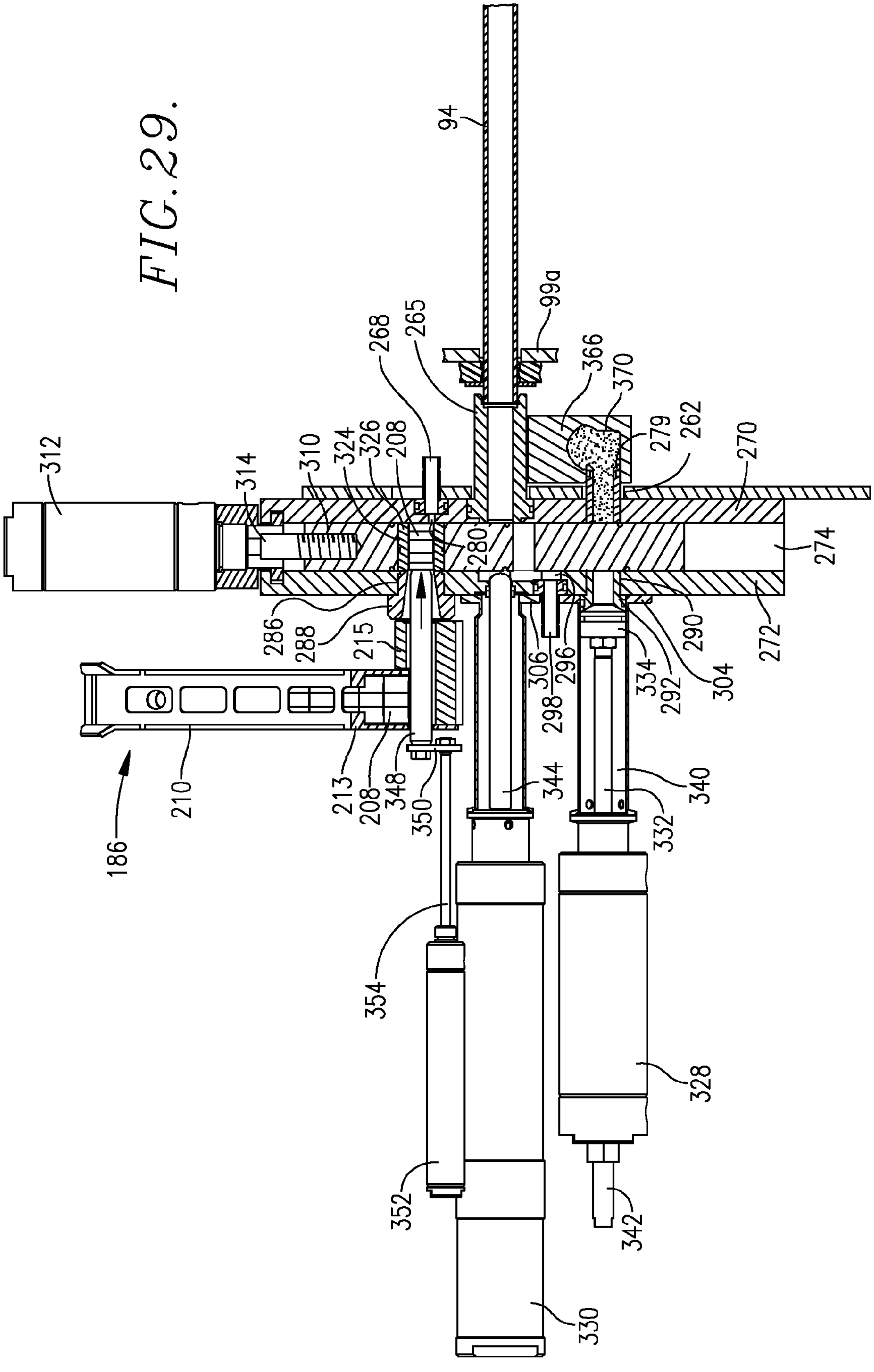
FIG. 29 is a sectional view similar to that of FIG. 28, depicting the configuration of the plug and meat emulsion injection assembly during an initial plug injection sequence.

FIG. 29 illustrates the subassembly 182 in its first operational position with the tubular element 265 operatively coupled with cooking tubes 94. In addition, this Figure depicts the initial insertion and seating of plugs 208 into the inserts 326 of plate 310. This is accomplished by appropriate actuation of the cylinder 352, which shifts the plug injection and seating rods 348 through the corresponding adjacent openings 215*a* and passageway structures 215 in order to shift the lowermost plug 208 within each channel toward and into the inserts 326. Any residual air present in the leading concavities of the seated plugs 208 is removed by means of a vacuum drawn through fittings 268.

Figure 30:
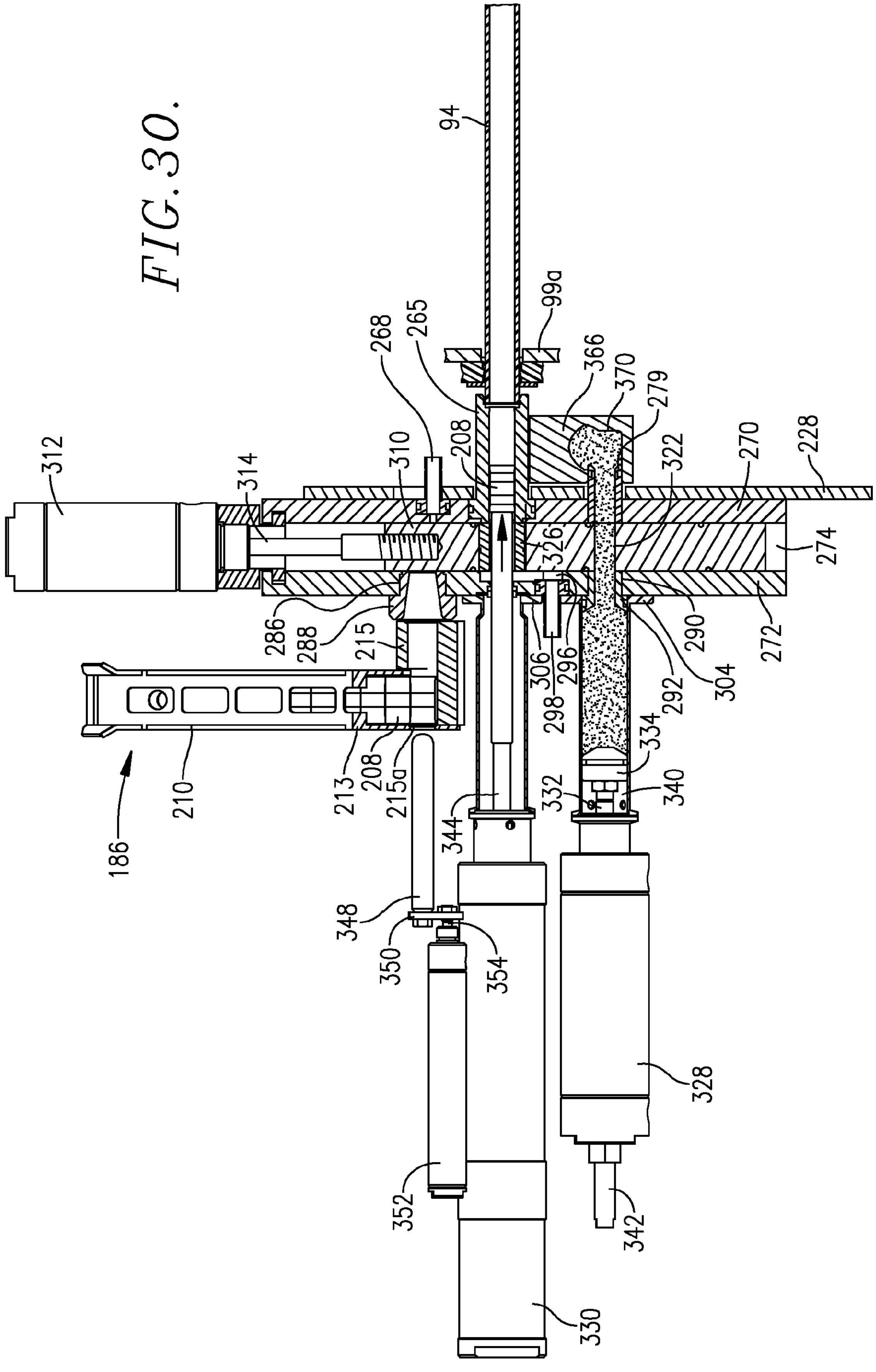
FIG. 30 is a sectional view similar to that of FIG. 29, depicting the configuration of the plug and meat emulsion injection assembly during drawing of a charge of meat emulsion and injection of a plug into a cooking tube.

FIG. 30 illustrates the next steps wherein the rods 348 have been withdrawn, thereby allowing the next adjacent plugs 208 to descend into loading positions. Further, the plate 310 has been shifted downwardly by actuation of the cylinder 312 to a second position wherein the inserts 326 are in alignment with the tubular elements 265, and the first stages of the cylinders 330 have been actuated to extend the rods 344 so as to move the initially-seated plugs 208 into the delivery elements 265. A vacuum drawn through the fittings 298 serves to remove air from the trailing concave face of the previously injected plugs 208. This downward shifting of the plates 310 also aligns the through-openings 322 with those of plate 310 with the meat emulsion conveying openings 290 of plate 272, and with the meat emulsion delivery openings 279 of plate 270. In this fashion, the initial portions or charges of meat emulsion 590 are drawn by actuation of the cylinders 328 into the portioning chambers 340.

Figures 31, 31A:
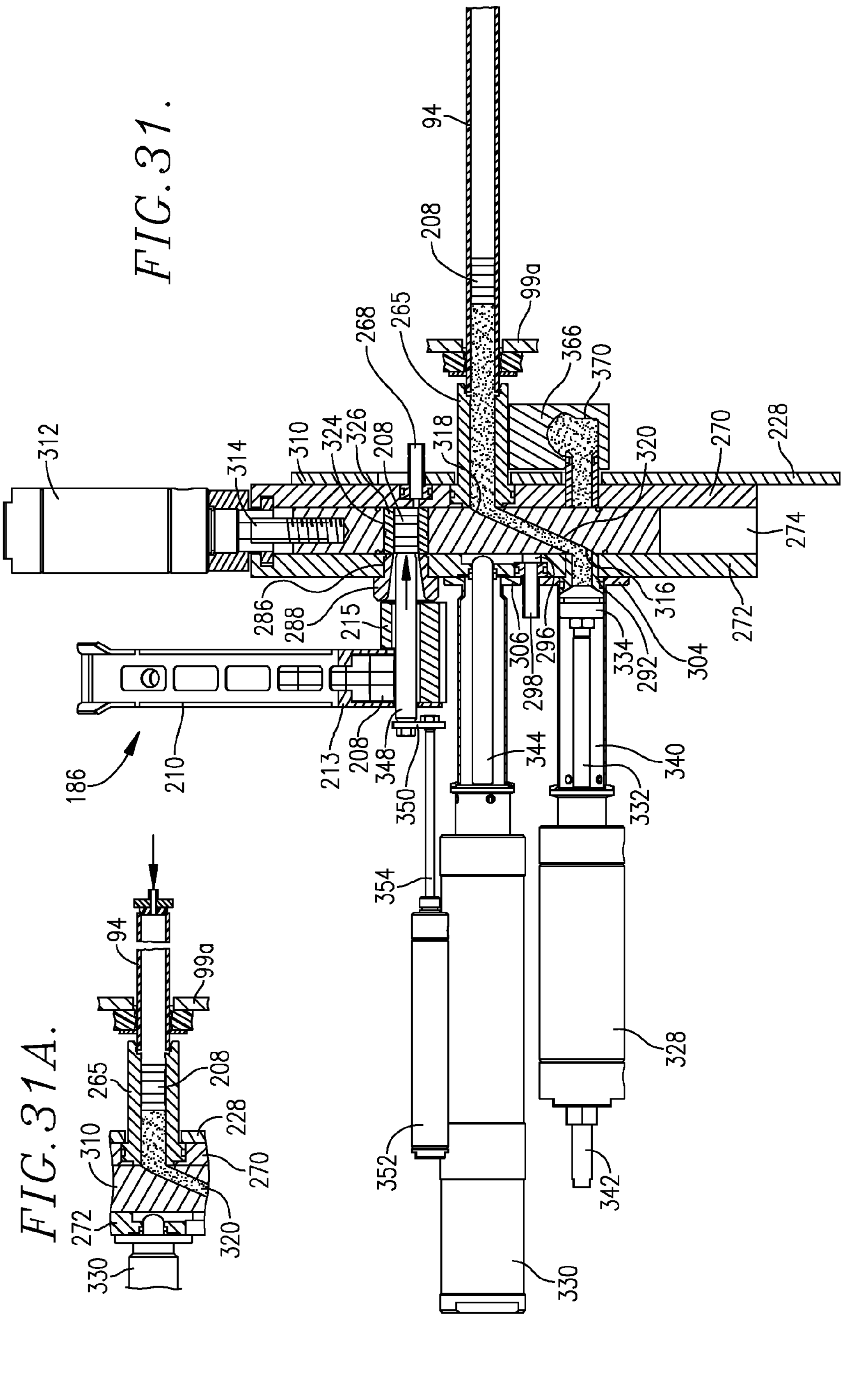
FIG. 31 is a sectional view similar to that of FIG. 30, depicting the configuration of the plug and meat emulsion injection assembly during injection of a charge of meat emulsion into the cooking tube behind the previously injected plug.
FIG. 31A is a fragmentary sectional view illustrating an alternative embodiment wherein a source of pressurized air is directed against the leading forming plugs within the cooking tubes during loading of the tubes with plugs and meat emulsion portions, and/or during cooking of the meat emulsion.

FIG. 31 illustrates the next steps wherein the plate 310 is shifted upwardly to the position of FIG. 29. This has two principal functions. First, the oblique passageways 320 are moved so as to communicate the portioning chambers 340 with the delivery elements 265, allowing actuation of the cylinders 328 in order to move the previously drawn initial portions of emulsion 590 from the chambers 340 into and through the delivery elements 265 and against the trailing face of the previously injected initial plugs 208. Second, the passageway 324 with inserts 326 therein are again located for loading of succeeding plugs 208 into the inserts 326, via the action of the cylinder 352 and rods 348.

FIG. 31A illustrates an additional embodiment wherein pressurized air is directed either continuously or intermittently against the rearward faces of the initially injected plugs 208 during filling of the tubes 94. As illustrated, a sealing plug and tubular injector assembly are used for air injection, as indicated by the arrow, with the sealing plug operatively engaging the output end of the tube. The pressurized air serves to inhibit any undo forward movement of these plugs away from the adjacent meat portions, owing to the speed of operation of the system 50.

It is also contemplated that pressurized air may be injected into the cooking tubes during emulsion cooking, either continuously or intermittently throughout all or a portion of the cooking sequence. This serves to cook the emulsion under positive pressure to assist in product formation. In such a situation, a plurality of the sealing plug and tubular injector assemblies would be positioned adjacent to the output ends of the tubes 94, and would be shiftable into engagement with the output ends, in the manner of the assemblies 65 and 68. Hence, during indexing movement of the housing 70, the sealing plug and tubular injector assemblies would be retracted, and once the housing 70 was indexed to its next position, these assemblies would be moved back into operative engagement with the outlet ends of the tubes 94. This serves to cook the emulsion portions under compressive pressure within the tubes 94.

Figure 32:
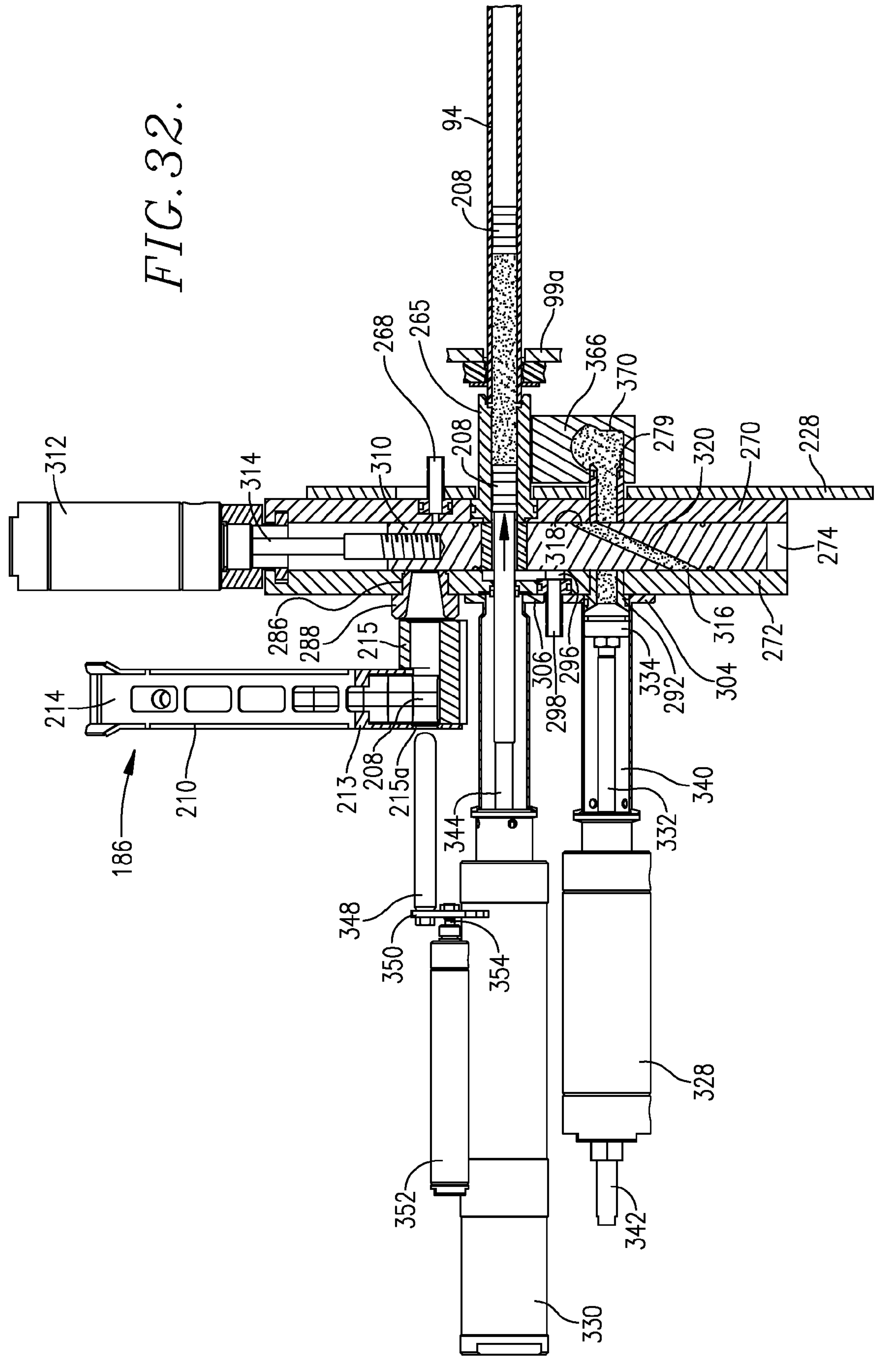
FIG. 32 is a sectional view similar to that of FIG. 31, depicting the configuration of the plug and meat emulsion injection assembly during injection of a second plug behind the previously injected emulsion charge and within the delivery tube.
Figure 33:
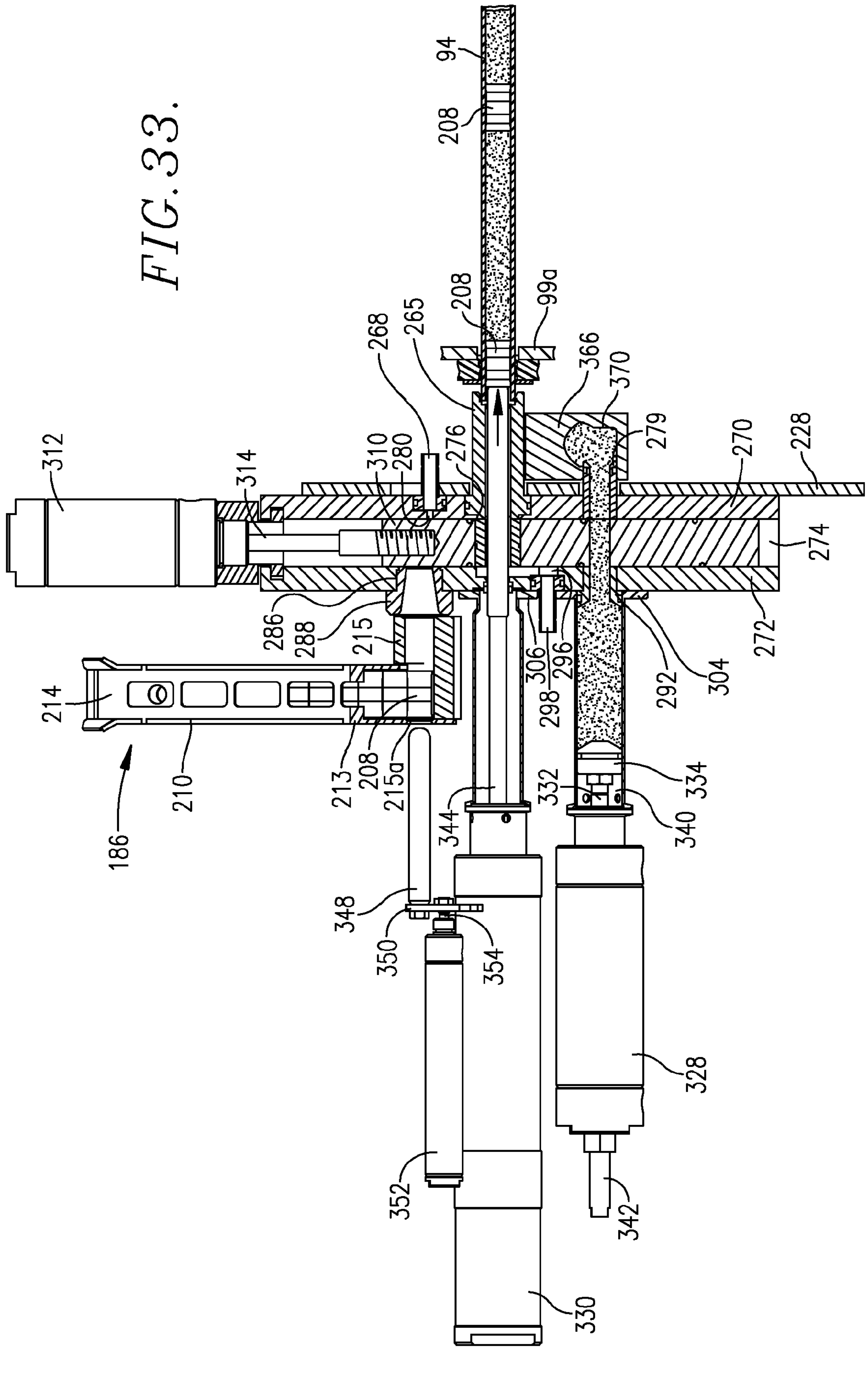
FIG. 33 is a sectional view similar to that of FIG. 32, depicting the configuration of the plug and meat emulsion injection assembly during insertion of the second plug into the cooking tube behind the previously injected emulsion charge.

FIG. 32 illustrates the plate 310 downwardly shifted to the FIG. 30 position, with the next succeeding plugs 208 being shifted through actuation of the second stages of cylinders 330, which moves the plugs 208 through the delivery elements 265 and into the cooking tubes 94. Finally, FIG. 33 illustrates the plate 310 again shifted so as to allow portions of meat emulsion 590 to be drawn into the portion chambers 340, for the next step of the tube loading operation.

It will thus be appreciated that the tubes 94 of array 92*a* will be successively filled with plugs 208 and intermediate portions of meat emulsion. This operation is facilitated by the presence of the thin film of lecithin/oil on the inner surfaces of the tubes 94. In this fashion, all of the portions are cooked to essentially the same degree. The lecithin/oil coating has been found to facilitate ejection of cooked product from the tubes 94, without disrupting the skinned surfaces of the products.

As explained, the steps of filling the tubes 94 of array 92*a*, the application of oil to the tubes 94 of array 92*b*, and the ejection of cooked product and plugs from the tubes 94 of array 92*c*, occur substantially simultaneously. Once these steps are completed for a given set of arrays 92*a*-92*c*, the assemblies 63, 65, and 68, and subassembly 182, are separated from the ends of the tubes 94 by operation of the associated pancake cylinders, to assume the standby positions thereof. This permits a further indexing operation of the housing 70 using the indexing drive 130, whereupon the foregoing assemblies and subassemblies are again moved into operative engagement with the tubes 94 and the above steps repeat.

As the housing 70 is successively indexed and the tubes 94 of the arrays are filled with meat emulsion and plugs, cooking of the emulsion portions within the tubes is carried out. The system 50 is operated so that by the time filled tubes 94 successively reach the ejection assembly 63 and the finished product and plug delivery assembly 65, the emulsion portions are cooked to the desired degree.

The plug recovery assembly 66 operates essentially continuously and serves to pick up the plugs 208 from the belt 384 and direct these plugs to the plug elevators 184. In this regard, two streams of cooked product and plugs 208 are successively deposited upon the conveyor 386. As the plugs reach the magnetic roller 40, they are separated from the cooked products and two parallel streams of plugs pass along the conveyor belt 438. At the end of the belt 438, the plugs are transferred to the individual conveyors 450 and 452. This serves to move the plugs 208, again in separate plug streams, to the respective plug elevators 184 where the plugs are picked up by the magnetic pickups 196. The plugs then descend through movement of the roller chains 188 until they reach the detachment segments 216 of the channels 210, 212 (FIG. 9). This causes the detachment of the plugs 208 from the pickups 196, allowing the plugs to descend into the channels for reuse, as described.

As indicated, during production operations of system 50, the plug storage assembly 69 is not used. However, during system shutdown, for purposes of cleanup or size changeover, the plugs 208 are collected, and assembly 69 is used for this purpose. Accordingly, the proper sized rack 564 or 566 is inserted into each unit 518 by sliding the racks into the spaces above the depending walls 573 until the racks engage the rack stops 567. Next, the racks are elevated using the assemblies 568 so that the screws 588*a* thereof engage the undersides of the corner blocks 525 and raise the racks to their loading positions in the units 518.

FIGS. 24 and 25 illustrate the filling of a rack 564 in a unit 518. Specifically, the forward gate 549 is first extended, which stops the flow of plugs to the associated plug elevator 184. Continued movement of the belt 450 causes succeeding plugs 208 to come into abutment and accumulate. This continues until a full row of plugs 208 is collected, whereupon the second gate 548 is actuated to prevent further plugs from entering the unit 518.

At this point, the roller 556 is rotated so as to pick up the entire row of plugs 208 between the gates, and to deposit this row onto a flight 542. As the roller chains 538 continue to move, the transferred row of plugs 208 is moved downwardly along the path of wall 562 until the row of plugs is deposited on the proximal recess provided in the plug rack 564. This operation is continued and as additional plug rows are created and transferred, the flights 542 move the previously collected plug rows to successive plug recesses spaced from roller 556.

When the rack 564 is filled, the rack elevator assembly 568 is actuated to lower the filled rack out of the path of the chain flights 542, allowing the filled rack to be removed from the unit 518. Specifically, the assembly 568 is operated to shift the filled rack 564 supported on the screws 588*a* to the lowered position thereof, thereby permitting sliding withdrawal of the filled rack from the unit 518.

The above description has focused on the production of smaller diameter hot dog-type products making use of the smaller diameter cooking tubes 94 and related components. When it is desired to produce larger diameter products, the tubes 96 are used and the previously-described change parts are installed on the system 50 in lieu of the smaller diameter change parts (see, e.g., FIG. 36). The slide frame 230 is also shifted to its alternate, lowered position. All other operations in the production of the larger diameter products are the same as those described previously.

In preferred forms, the tubes 94, 96 and all other meat emulsion-conveying components are the system 50 are formed from extruded Teflon. It has been found that this material gives an advantageous balance between cooking efficiency while avoiding problems of sticking and the like, which can degrade the integrity of the finished products. In other instances, however, materials such as stainless steel may be used.

The provision of plug-retaining shoulders 265*c* on the elements 265, and shoulders 97 on the cooking tubes 94, 96 is important in that it inhibits backward travel of the plugs 208 after insertion thereof. It has been found that without such shoulders, the plugs 208 can migrate backwardly, owing to the pressure conditions within the tubes, and thus disrupt production. The shoulders 265*c* and 97 have been found to mitigate this problem. However, along with the shoulders 97, positive pressure air or mechanical stops could be employed at the input ends of the tubes 94 after complete filling thereof as an additional means of preventing backward migration of the plugs 208. In the former case, seal and injector assemblies of the type illustrated in FIG. 31A could be employed.

The preferred embodiment of the invention makes use of cooking tubes 94, 96, which are axially fixed, and operating assemblies 62, 63 and 68, which move axially relative to the cooking tubes between standby and operating positions. FIG. 49 illustrates an embodiment wherein alternate cooking tubes, such as tube 96*a*, are axially shiftable and are provided with a biasing spring 144 serving to urge the cooking tubes rightwardly. In this case, a tube-displacing mechanism including actuator 150*a* is provided to engage the beveled ends 150 of the tubes 96*a*. In operation, the mechanism engages the ends 150 and axially shifts the tubes 96*a* against the bias of the springs 144 and into mating engagement with a forward emulsion and plug filling assembly. At the same time, filled tubes 96*a* engage an ejector device which serves to push the contents of the filled tubes rearward and out the tube ends.

We claim:

1. A method of creating and at least partially cooking elongated, comestible products without the use of casings, said method comprising the steps of:

loading comestible material into the inlet end of at least one of a plurality of separate, individual cooking tubes, each presenting a longitudinal axis and an inlet end at a material loading station;

shifting said tubes in a first direction transverse to the longitudinal axes thereof until the inlet end of another of said tubes is at said material loading station, and loading comestible material into the inlet end of the other tube;

at least partially cooking the comestible material within said tubes; and discharging the at least partially cooked material from said tubes at a discharge station separate from said loading station.

2. The method of claim 1, said discharging step comprising the step of sequentially moving said tubes in a second direction transverse to the longitudinal axes thereof into said discharge station, and sequentially discharging the at least partially cooked material from the tubes at the discharge station.

3. The method of claim 2, said first and second directions being the same.

4. The method of claim 1, each of said tubes having an outlet end opposite said inlet end thereof, said discharging step comprising the step of discharging said at least partially cooked material from said outlet ends thereof at said discharge station.

5. The method of claim 1, said tubes being arranged in a generally circular pattern with the tubes substantially parallel with each other and circumferentially spaced apart, said shifting step comprising the steps of incrementally and circumferentially shifting the tubes making up said pattern so that the respective inlet ends of the tubes move into said loading station, and individually loading said tubes with comestible material in the loading station.

6. The method of claim 5, including the steps of incrementally moving said tubes containing at least partially cooked comestible material into said separate discharge station, and individually discharging said at least partially cooked material from the tubes, said individual loading and individual discharging steps being carried out simultaneously.

7. The method of claim 6, said cooking step including the step of heating each of said tubes after said loading thereof in the loading station and until the each of the tubes reach said discharge station.

8. The method of claim 7, said heating step comprising the step of heating said material through the walls of said tubes, by providing energy exchange media about the tubes.

9. The method of claim 8, said energy exchange media selected from the group consisting of hot water, steam, and mixtures thereof.

10. The method of claim 1, including the step of injecting a series of plugs into said tubes at said loading station so that the tubes have individual portions of said comestible material with plugs on opposite ends of and engaging each portion.

11. The method of claim 10, including the steps of discharging said plugs and said at least partially cooked portions from the tubes at said discharge station.

12. The method of claim 11, including the step of recovering said discharged plugs and reusing the plugs at said loading station, said plug recovery step comprising the steps of moving said discharged plugs along a path of travel to said loading station, and re-injecting the plugs into said tubes.

13. The method of claim 10, each of said plugs having opposed concave ends, said plug injection step comprising the steps of withdrawing air from the concave ends during said injection of the plugs.

14. The method of claim 1, including the step of applying a lubricant to the inner surfaces of said tube, prior to said loading of the tubes at said loading station.

15. The method of claim 1, said tubes being arranged in a generally circular pattern with the tubes substantially parallel with each other and circumferentially spaced apart, there being an array of tubes at each circumferential tube location, the tubes of each array being radially spaced from each other, each of said arrays being sequentially moved into said loading and discharge stations.

16. The method of claim 15, including the step of simultaneously loading a plurality of tubes of each array with said comestible material in said loading station, and simultaneously discharging at least partially cooked material from said plurality of tubes in said discharge station.

17. The method of claim 15, including the step of locating said pattern of tubes within a cylindrical, enclosed housing, and supplying energy exchange media to the housing for at least partial cooking of said comestible material within said tubes.

18. The method of claim 15, each of said tube arrays having cooking tubes of different diameters.

19. The method of claim 1, said comestible material comprising a flowable meat-containing mixture.

20. The method of claim 1, each of said tubes having an outlet end opposite said inlet end thereof, said material discharging step comprising the step of injecting a discharge liquid selected from the group consisting of water and oil into the inlet ends of each of said tubes at said discharge station, and forcing the at least partially cooked material out of the outlet ends of each of the tubes.

21. The method of claim 20, said liquid being hot.

22. The method of claim 1, including the step of applying a substance to the surface of said at least partially cooked material after the material is discharged from said cooking tubes, in order to assist in skin formation or color development of the at least partially cooked material.

23. The method of claim 1, including the step of fixing said tubes against axial shifting movement.

24. The method of claim 1, including the step of axially shifting said tubes in said loading station during loading of the tubes.

25. The method of claim 1, including the step of subjecting said comestible material to a compressive force during said cooking thereof.

26. The method of claim 25, including the step of injecting positive pressure air into said tubes in order to generate said compressive force.

27. The method of claim 1, including the step of creating a positive pressure within said tubes during said loading thereof.

28. In a method of creating and at least partially cooking a sausage-type meat product including the step of injecting meat emulsion into an elongated cooking tube, heating the emulsion within the tube for at least partial cooking thereof, and discharging the at least partially cooked emulsion from the cooking tube, the improvement which comprises the step of applying a substance to the surface of the at least partially cooked emulsion after discharge thereof from said cooking tube, in order to assist in skin formation or color development of the at least partially cooked emulsion.

29. In a method of creating and at least partially cooking a sausage-type meat product including the steps of injecting meat emulsion into an elongated cooking tube, heating the emulsion within the tube for at least partial cooking thereof, and discharging the at least partially cooked emulsion from the cooking tube, the improvement which comprises the steps of injecting a series of plugs into said tube along with said emulsion, so that the tube has at least one elongated emulsion portion therein, with plugs on opposite ends of and engaging said portion, and applying a substance to the surface of the at least partially cooked emulsion after discharge thereof from said cooking tube, in order to assist in skin formation and/or color development of the at least partially cooked emulsion.

30. In a method of creating and at least partially cooking a sausage-type meat product including the step of injecting meat emulsion into an elongated cooking tube, heating the emulsion within the tube for at least partial cooking thereof, and discharging the at least partially cooked emulsion from the cooking tube, the improvement which comprises the step of discharging said partially cooked emulsion by injecting a discharge liquid selected from the group consisting of water and oil into said tube and forcing the at least partially cooked emulsion from the tube.

31. In a method of creating and at least partially cooking a sausage-type meat product including the steps of injecting meat emulsion into an elongated cooking tube, heating the emulsion within the tube for at least partial cooking thereof, and discharging the at least partially cooked emulsion from the cooking tube, the improvement which comprises the steps of injecting a series of plugs into said tube along with said emulsion, so that the tube has at least one elongated emulsion portion therein, with plugs on opposite ends of and engaging said portion, and discharging said partially cooked emulsion by injecting a discharge liquid selected from the group consisting of water and oil into said tube and forcing the at least partially cooked emulsion from the tube.

32. In a method of creating and at least partially cooking a sausage-type meat product including the step of injecting meat emulsion into an elongated cooking tube, heating the emulsion within the tube for at least partial cooking thereof, and discharging the at least partially cooked emulsion from the cooking tube, the improvement which comprises the step of applying lubricant to the inner surface of the tube prior to said meat-emulsion step.

33. The method of claim 32, said lubricant comprising a lecithin/oil mixture.

34. In a method of creating and at least partially cooking a sausage-type meat product including the step of injecting meat emulsion into an elongated, rectilinear cooking tube presenting a tube longitudinal axis along with a series of elongated plugs each having a plug longitudinal axis at a loading station, so that the tube has a plurality of individual emulsion portions therein with coaxially oriented elongated plugs on opposite ends and engaging each of said portions, heating the emulsion portions within the tube for at least partial cooking thereof, and discharging the at least partially cooked emulsion portions and said elongated plugs from the cooking tube at a discharge station with the longitudinal axes of the plugs in general alignment with the longitudinal axis of the cooking tube, the improvement which comprises the steps of recovering said plugs for re-injection into said tube at said discharge station and maintaining the longitudinal axes of the plugs substantially parallel with said tube longitudinal axis throughout said plug recovery step.

35. The method of claim 34, said plug recovery step comprising the steps of conveying said plugs after said discharge thereof at said discharge station along a path of travel parallel with the tube longitudinal axis, and delivering said recovered plugs to said loading station with the longitudinal axes of the plugs substantially parallel with the tube longitudinal axis.

36. A method of creating and at least partially cooking elongated, comestible products without the use of casings, said method comprising the steps of:

loading comestible material into at least one tube of a plurality of separate, individual cooking tubes at a material loading station, each of said plurality of tubes presenting a respective longitudinal axis and first and second opposed ends, said tubes extending through an enclosed, shiftable housing, with the interiors of the tubes being out of communication with said housing;

shifting said at least one tube and the others of said plurality of cooking tubes in a first direction transverse to the longitudinal axes of the cooking tubes until another of said tubes is at said material loading station, and loading comestible material into said other tube;

at least partially cooking the comestible material within said one and other tube; and discharging the at least partially cooked material from said one and other tube at a discharge station separate from said loading station.

37. The method of claim 36, said discharging step comprising the step of sequentially moving said tubes in a second direction transverse to the longitudinal axes thereof into said discharge station, and sequentially discharging the at least partially cooked material from the tubes at the discharge station.

38. The method of claim 37, said first and second directions being the same.

39. The method of claim 36, each of said tubes having an outlet end opposite said inlet end thereof, said discharging step comprising the step of discharging said at least partially cooked material from said outlet ends of said one and other tubes at said discharge station.

40. The method of claim 36, said plurality of tubes being arranged in a generally circular pattern with the tubes substantially parallel with each other and circumferentially spaced apart, said shifting step comprising the steps of incrementally and circumferentially shifting the tubes making up said pattern so that the respective inlet ends of the one and other tubes move into said loading station, and individually loading said one and other tubes with comestible material in the loading station.

41. The method of claim 40, including the steps of incrementally moving said one and other tubes containing at least partially cooked comestible material into said separate discharge station, and individually discharging said at least partially cooked material from said one and other tubes, said individual loading and individual discharging steps being carried out simultaneously.

42. The method of claim 41, said cooking step including the step of heating each of said one and other tubes after said loading thereof in the loading station and until the each of said one and other tubes reach said discharge station.

43. The method of claim 42, said heating step comprising the step of heating said material through the walls of said one and other tubes, by providing energy exchange media about said one and other tubes.

44. The method of claim 43, said energy exchange media selected from the group consisting of hot water, steam, and mixtures thereof.

45. The method of claim 36, including the step of injecting a series of plugs into said one and other tubes at said loading station so that said one and other tubes have individual portions of said comestible material with plugs on opposite ends of and engaging each portion.

46. The method of claim 45, including the steps of discharging said plugs and said at least partially cooked portions from said one and other tubes at said discharge station.

47. The method of claim 46, including the step of recovering said discharged plugs and reusing the plugs at said loading station, said plug recovery step comprising the steps of moving said discharged plugs along a path of travel to said loading station, and re-injecting the plugs into said one and other tubes.

48. The method of claim 45, each of said plugs having opposed concave ends, said plug injection step comprising the steps of withdrawing air from the concave ends during said injection of the plugs.

* * * * *